US012782837B2

(12) United States Patent
Takahashi et al.

(10) Patent No.: US 12,782,837 B2
(45) Date of Patent: Nov. 3, 2026

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Koji Takahashi, Chiba (JP); Motoya Yamada, Chiba (JP); Shubun Kujirai, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 578 days.

(21) Appl. No.: 18/453,986

(22) Filed: Aug. 22, 2023

(65) Prior Publication Data

US 2024/0094650 A1 Mar. 21, 2024

(30) Foreign Application Priority Data

Aug. 24, 2022 (JP) ................................ 2022-132908
Apr. 14, 2023 (JP) ................................ 2023-066553
Jun. 27, 2023 (JP) ................................ 2023-105401

(51) Int. Cl.
*G03G 9/087* (2006.01)
*G03G 7/00* (2006.01)

(52) U.S. Cl.
CPC ......... *G03G 7/0086* (2013.01); *G03G 7/0053* (2013.01); *G03G 2221/183* (2013.01)

(58) Field of Classification Search
CPC ...................................................... G03G 5/142
See application file for complete search history.

(56) References Cited

U.S. PATENT DOCUMENTS 4,442,193 A 4/1984 Chen et al.
4,992,349 A 2/1991 Chen et al.
(Continued)

FOREIGN PATENT DOCUMENTS

EP 772090 * 5/1997 ............... G03G 5/00
JP 2020020919 A 2/2020
(Continued)

OTHER PUBLICATIONS

Brooks A. Jones, et al., Cyanonaphthalene Diimide Semiconductors for Air-Stable, Flexible, and Optically Transparent n-Channel Field-Effect Transistors, Chemistry of Materials, vol. 19, No. 11, May 29, 2007, American Chemical Society.
(Continued)

*Primary Examiner* — Peter L Vajda
(74) *Attorney, Agent, or Firm* — Canon U.S.A., Inc. IP Division

(57) ABSTRACT

An electrophotographic photosensitive member comprising a support, an electroconductive layer, an undercoat layer, a charge generating layer, and a hole transporting layer in this order, wherein when an ionization potential of the electroconductive layer is defined as IPc, the IPc is 5.4 to 5.8 eV, and when an ionization potential of the undercoat layer is defined as IPu, the IPu is 6.0 eV or more, wherein the undercoat layer comprises an electron transporting compound and a compound (α), and when an ionization potential of the compound (α) is defined as IPα, the IPc, the IPu, and the IPα satisfy relation (1):

$$IPu-IPc>IP\alpha-IPc \quad (1).$$

16 Claims, 1 Drawing Sheet

(56) References Cited

U.S. PATENT DOCUMENTS

| | | | | |
|---|---|---|---|---|
| 5,468,583 | A | 11/1995 | Gruenbaum et al. | |
| 10,642,173 | B1 * | 5/2020 | Iwasaki | G03G 5/0672 |

FOREIGN PATENT DOCUMENTS

| | | | |
|---|---|---|---|
| JP | 2020046640 | A | 3/2020 |
| JP | 2020101652 | A | 7/2020 |

OTHER PUBLICATIONS

Brooks A. Jones, et al., Tuning Orbital Energetics in Arylene Diimide Semiconductors. Materials Design for Ambient Stability of n-Type Charge Transport, JACS Articles, Web, Nov. 14, 2007, American Chemical Society.

* cited by examiner

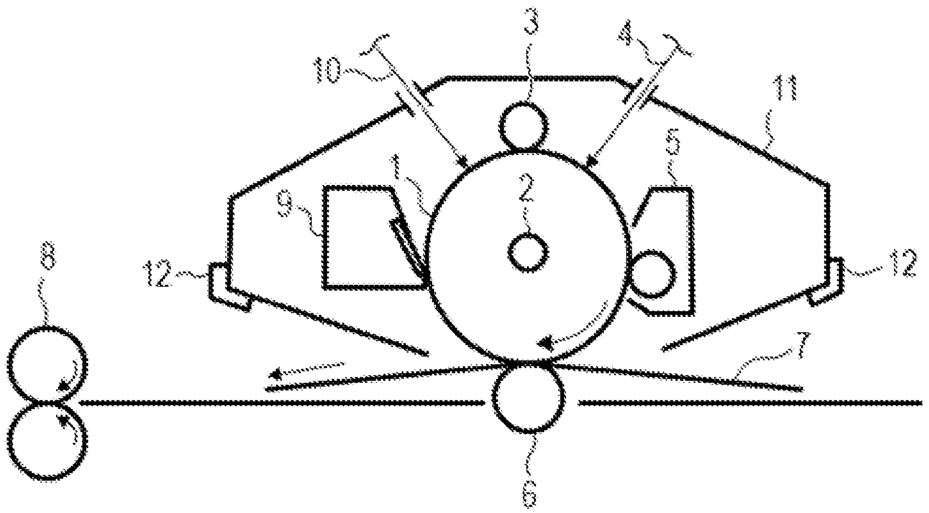
3
4
10
11
1
2
5
9
8
12
12
7
6

ELECTROPHOTOGRAPHIC PHOTOSENSITIVE MEMBER, PROCESS CARTRIDGE, AND ELECTROPHOTOGRAPHIC APPARATUS

BACKGROUND

Field of the Disclosure

The present disclosure relates to an electrophotographic photosensitive member, a process cartridge comprising the electrophotographic photosensitive member, and an electrophotographic apparatus comprising the electrophotographic photosensitive member.

Description of the Related Art

In recent years, higher image quality and higher stability have been required for images output in electrophotographic apparatus.

Japanese Patent Application Laid-Open Nos. 2020-101652 and 2020-46640 are available as techniques to solve such problems.

Japanese Patent Application Laid-Open No. 2020-101652 describes an electrophotographic photosensitive member containing specific perinone compound and amine compound with an ionization potential in the atmosphere of 5.4 to 5.9 eV.

Japanese Patent Application Laid-Open No. 2020-46640 describes an electrophotographic photosensitive member with an undercoat layer containing specific perinone compound and polyurethane.

According to an investigation produced by the inventors of the present disclosure, it was found that the electrophotographic photosensitive members described in Japanese Patent Application Laid-Open Nos. 2020-101652 and 2020-46640 have a high residual potential and that there is room for improvement in the potential fluctuation.

SUMMARY

An object of the present disclosure is to provide an electrophotographic photosensitive member with a low residual potential and a small potential fluctuation.

The object is achieved by the present disclosure described below.

The present disclosure is an electrophotographic photosensitive member comprising a support, an electroconductive layer, an undercoat layer, a charge generating layer, and a hole transporting layer in this order, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer comprises an electron transporting compound and a compound (α), and when an ionization potential of the compound (α) is defined as IPα, the IPc, the IPu and the IPα satisfy relation (1):

$$IPu-IPc>IP\alpha-IPc \quad (1).$$

Alternatively, the present disclosure is an electrophotographic photosensitive member comprising a support, an electroconductive layer, an undercoat layer, a charge generating layer, and a hole transporting layer in this order, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer is formed by copolymerization of a compound (β) with an electron transporting compound, and when an ionization potential of the compound (β) is defined as IPβ, the IPc, the IPu and the IPβ satisfy relation (2):

$$IPu-IPc>IP\beta-IPc \quad (2).$$

Further features of the present disclosure will become apparent from the following description of exemplary embodiments with reference to the attached drawing.

BRIEF DESCRIPTION OF THE DRAWINGS

FIG. 1 is a view for illustrating an example of the schematic configuration of an electrophotographic apparatus comprising a process cartridge comprising an electrophotographic photosensitive member.

DESCRIPTION OF THE EMBODIMENTS

The present disclosure is described in detail below by way of an exemplary embodiment.

When the present inventors examined the techniques described in Japanese Patent Application Laid-Open Nos. 2020-101652 and 2020-46640, it was found that the injection of holes from the support into the undercoat layer was small, and the residual potential increased and the potential fluctuation increased because it became difficult to cancel electrons charged in an undercoat layer when electrons stayed in the undercoat layer.

To solve this technical problem, the present inventors examined the injection of holes from the support into the undercoat layer.

As a result of the above examination, it was found that the above technical problem could be solved by using an electrophotographic photosensitive member with the following configuration.

That is, the present disclosure is an electrophotographic photosensitive member comprising a support, an electroconductive layer, an undercoat layer, a charge generating layer, and a hole transporting layer in this order, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer comprises an electron transporting compound and a compound (α), and when an ionization potential of the compound (α) is defined as IPα, the IPc, the IPu and the IPα satisfy relation (1):

$$IPu-IPc>IP\alpha-IPc \quad (1)$$

Alternatively, the present disclosure is an electrophotographic photosensitive member comprising a support, an electroconductive layer, an undercoat layer, a charge generating layer, and a hole transporting layer in this order, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer is formed by copolymerization of a compound (β) with an electron transporting compound, and when an ionization potential of the compound (β) is defined as IPβ, the IPc, the IPu and the IPβ satisfy relation (2):

$$IPu-IPc>IP\beta-IPc \quad (2)$$

With the above configuration of the present disclosure, the inventors surmise as follows on the mechanism by which the above technical problems can be solved.

Because of the characteristics of the undercoat layer with a large ionization potential containing electron transporting compounds, there is less hole injection from the electroconductive layer to the undercoat layer, and the removal of electrons in the undercoat layer depends exclusively on the transport of electrons in the undercoat layer. Therefore, when electrons are retained in the undercoat layer, they are less likely to be removed from the undercoat layer, and the residual potential tends to rise.

In the conventional technique, it is conjectured that the retained electrons in the undercoat layer were less likely to be removed, resulting in a higher residual potential and a greater fluctuation in the potential (especially the light potential).

In the present disclosure, when an ionization potential of the electroconductive layer is defined as IPc, the IPc is 5.4 to 5.8 eV, and when an ionization potential of the undercoat layer is defined as IPu, the IPu is 6.0 eV or more, and when an ionization potential of compound (α) or (β) is defined as IPα or IPβ, the IPc, the IPu, the IPα and the IPβ satisfy IPu−IPc>IPα−IPc (1) or IPu−IPc>IPβ−IPc (2), thereby, it is considered that the injection of holes from the electroconductive layer into the undercoat layer is promoted, the removal of electrons that tend to stay in the undercoat layer is facilitated, the residual potential is lowered, and the potential fluctuation can be suppressed.

<Measurement of Ionization Potential>

Ionization potential is usually derived by atmospheric photoelectron yield spectroscopy (PYSA) or photoelectron yield spectroscopy (PYS). It is known that the values derived by the above two methods differ due to differences in the amount of moisture on the sample surface, etc. The ionization potential in the present disclosure is derived by photoelectron yield spectroscopy (PYS). Measurements can be made under a nitrogen atmosphere, taking the energy of ultraviolet light irradiated on the horizontal axis and the square root of the amount of photoemission on the vertical axis, and from the intersection of the slope and the background.

[Electrophotographic Photosensitive Member]

An electrophotographic photosensitive member according to the present disclosure comprises a support, an electroconductive layer, an undercoat layer formed on the electroconductive layer, and a photosensitive layer formed on the undercoat layer. The support is preferably cylindrical shape. The photosensitive layer preferably comprises a charge generating layer formed on the undercoat layer and a hole transporting layer formed on the charge generating layer.

An example of a method of producing the electrophotographic photosensitive member according to the present disclosure is a method including: preparing coating liquids for respective layers to be described later, forming coating films of the coating liquids, and drying and/or curing the coating films. In this case, examples of a method of applying each of the coating liquids (method of forming the coating films) include blade coating, curtain coating, wire bar coating, ring coating, and so on. Of those, dip coating is preferred from the viewpoints of efficiency and productivity.

The support and the respective layers are described below.

<Support>

The electrophotographic photosensitive member according to the present disclosure preferably includes a support having a cylindrical shape, and the surface of the support is preferably formed of at least any one selected from Al and an Al alloy. In addition, the surface of the support may be subjected to, for example, hot water treatment, blast treatment, or cutting treatment.

<Electroconductive Layer>

The electroconductive layer of the electrophotographic photosensitive member in the present disclosure has an IPc of 5.4 to 5.8 eV, preferably 5.6 to 5.8 eV, when an ionization potential of the electroconductive layer is defined as the IPc.

The electroconductive layer preferably contains electroconductive particles and a resin.

A material for the electroconductive particles is, for example, a metal oxide, a metal, carbon black, or silicon oxide.

Examples of the metal oxide include zinc oxide, aluminum oxide, indium oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, a metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, each of the electroconductive particles may be of a laminated construction having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably from 1 to 500 nm, more preferably from 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer has a thickness of preferably from 1 to 50 μm, particularly preferably from 3 to 40 μm.

The electroconductive layer may be formed by preparing a coating liquid for an electroconductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. As a dispersion method for dispersing the electroconductive particles in the coating liquid for an electroconductive layer, there are given methods including using a paint shaker, a sand mill, a ball mill, and a liquid collision-type high-speed disperser.

<Undercoat Layer>

The undercoat layer of the electrophotographic photosensitive member of the present disclosure has a feature that:

when an ionization potential of the undercoat layer is defined as IPu, the IPu is 6.0 eV or more, the undercoat layer comprises an electron transporting compound and a compound (α), and when an ionization potential of the compound (α) is defined as Ipa, the Ipc, the Ipu and the Ipa satisfy relation (1).

$$IPu-IPc>IP\alpha-IPc \quad (1)$$

Alternatively, the undercoat layer of the electrophotographic photosensitive member of the present disclosure has a feature that:

when an ionization potential of the undercoat layer is defined as IPu, the IPu is 6.0 eV or more, and the undercoat layer is produced by copolymerization of a compound (β) and an electron transporting compound, and when an ionization potential of the compound (β) is defined as IPβ, the IPc, the IPu and the IPβ satisfy relation (2).

$$IPu-IPc>IP\beta-IPc \quad (2)$$

In the present disclosure, the ionization potential IPu of the undercoat layer is preferably 6.0 to 6.3 eV.

In the present disclosure, it is preferable that the IPc and the IPα satisfy relation (3) and the IPc and the IPβ satisfy relation (6) from the viewpoint of efficiently injecting holes from the support into the undercoat layer.

$$IP\alpha \leq IPc-0.2\text{ eV} \quad (3)$$

$$IP\beta \leq IPc-0.2\text{ eV} \quad (6)$$

For the same reason, in the present disclosure, it is preferable that the IPc and the IPα satisfy relation (4) and the IPc and the IPβ satisfy relation (7).

$$IP\alpha < IPc-0.3\text{ eV} \quad (4)$$

$$IP\beta < IPc-0.3\text{ eV} \quad (7)$$

In order to suppress excessive injection of holes from the support to the undercoat layer, it is preferable that the IPc and the IPα satisfy relation (5) and the IPc and the IPβ satisfy relation (8).

$$IP\alpha \geq IPc-0.8\text{ eV} \quad (5)$$

$$IP\beta \geq IPc-0.8\text{ eV} \quad (8)$$

The compound (α) contained in the undercoat layer according to the present disclosure is preferably a compound represented by formula (α).

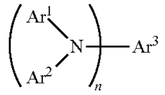

(α)

In formula (α), $Ar^1$ and $Ar^2$ each independently denote a substituted or unsubstituted phenyl group. $Ar^3$ denotes an n-valent aromatic group, and n is an integer of 1 to 3.

The compound (β) contained in the undercoat layer according to the present disclosure is preferably a compound represented by formula (β).

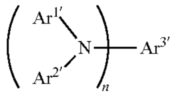

(β)

In formula (β), $Ar^{1'}$ and $Ar^{2'}$ each independently denote a substituted or unsubstituted phenyl group. Provide that, at least one of $Ar^{1'}$ and $Ar^{2'}$ is a phenyl group substituted with a polymerizable functional group. $Ar^{3'}$ denotes an n-valent aromatic group, and n is an integer of 1 to 3.

The polymerizable functional group includes an isocyanate group, a block isocyanate group, a methylol group, an alkylated methylol group, an epoxy group, a metal alkoxide group, a hydroxyl group, an amino group, a carboxy group, a thiol group, a carboxylic anhydride group, a carbon-carbon double bond group, etc.

The compound selected from a group consisting of a compound (α) and a compound (β) may be used as only one or two or more compounds in combination.

(Compound (α) represented by formula (α) and Compound (β) represented by formula (β))

Compound (α) represented by formula (α) and compound (β) represented by formula (β) are hole transporting substances. Specific examples of the compound (α) represented by formula (α) and the compound (β) represented by formula (β), and the ionization potential IPα for the compound (α) and the ionization potential IPβ for the compound (β) are shown in Tables 1-1 and 1-2 below.

TABLE 1-1

| Compound | Structure | Ipα[eV] or Ipβ[eV] |
|---|---|---|
| α1 | 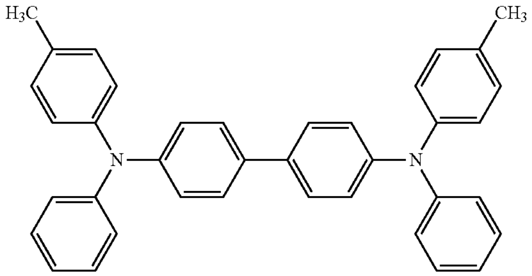 [SMILES: Cc1ccc(N(c2ccccc2)c2ccc(-c3ccc(N(c4ccccc4)c4ccc(C)cc4)cc3)cc2)cc1] | 5.2 |

TABLE 1-1-continued
| Compound | Structure | Ipα[eV] or Ipβ[eV] |
|---|---|---|
| α2 | 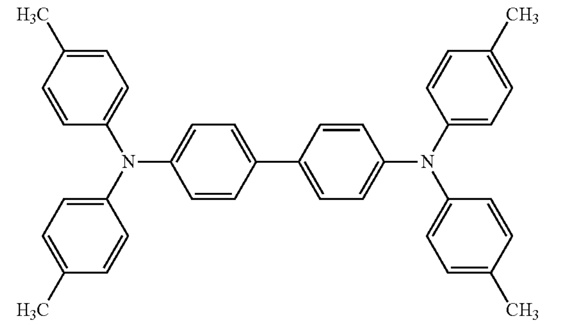 [SMILES: Cc1ccc(N(c2ccc(C)cc2)c2ccc(-c3ccc(N(c4ccc(C)cc4)c4ccc(C)cc4)cc3)cc2)cc1] | 5.3 |
| α3 | 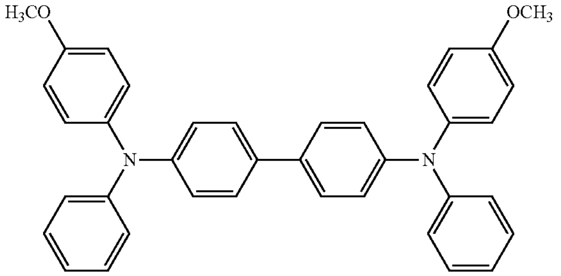 [SMILES: COc1ccc(N(c2ccccc2)c2ccc(-c3ccc(N(c4ccccc4)c4ccc(OC)cc4)cc3)cc2)cc1] | 5.1 |
| α4 | 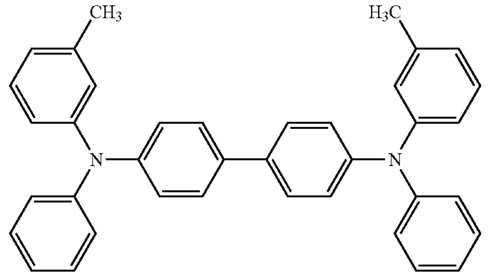 [SMILES: Cc1cccc(N(c2ccccc2)c2ccc(-c3ccc(N(c4ccccc4)c4cccc(C)c4)cc3)cc2)c1] | 5.4 |
| α5 | 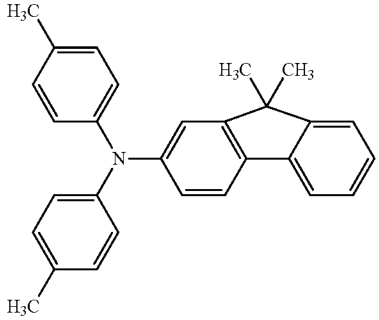 [SMILES: Cc1ccc(N(c2ccc(C)cc2)c2ccc3c(c2)C(C)(C)c2ccccc2-3)cc1] | 5.4 |
| α6 | 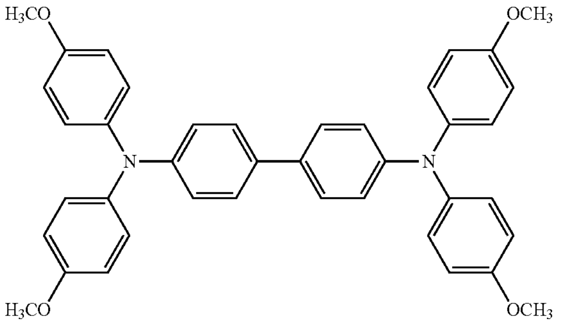 [SMILES: COc1ccc(N(c2ccc(OC)cc2)c2ccc(-c3ccc(N(c4ccc(OC)cc4)c4ccc(OC)cc4)cc3)cc2)cc1] | 5.0 |

TABLE 1-1-continued
| Compound | Structure | Ipα[eV] or Ipβ[eV] |
|---|---|---|
| β1 | 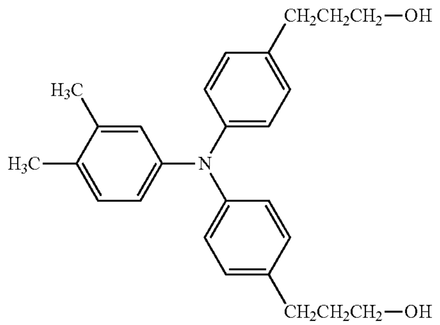 | 5.5 |
| β2 | 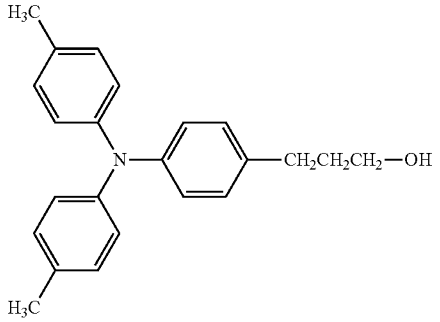 | 5.5 |
TABLE 1-2
| Compound | Structure | Ipα[eV] or Ipβ[eV] |
|---|---|---|
| α7 | 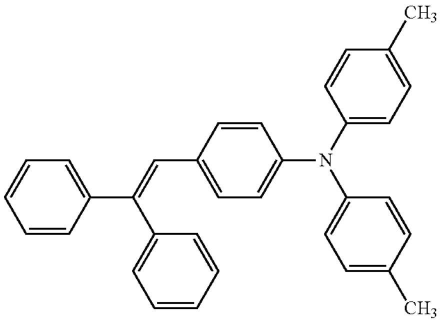 [SMILES: Cc1ccc(N(c2ccc(C)cc2)c2ccc(C=C(c3ccccc3)c3ccccc3)cc2)cc1] | 5.9 |
| α8 | 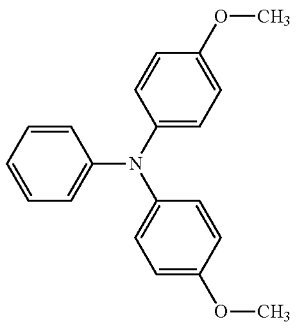 [SMILES: COc1ccc(N(c2ccccc2)c2ccc(OC)cc2)cc1] | 5.7 |

TABLE 1-2-continued
| Compound | Structure | Ipα[eV] or Ipβ[eV] |
|---|---|---|
| α9 | 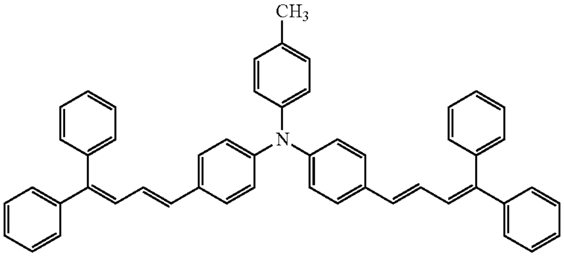 [SMILES: Cc1ccc(N(c2ccc(/C=C/C=C(c3ccccc3)c3ccccc3)cc2)c2ccc(/C=C/C=C(c3ccccc3)c3ccccc3)cc2)cc1] | 5.8 |
| β3 | 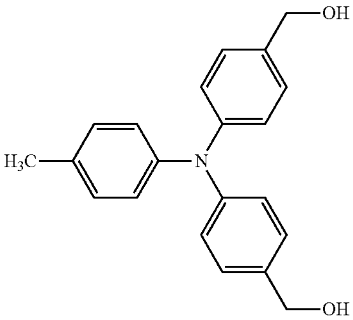 [SMILES: Cc1ccc(N(c2ccc(CO)cc2)c2ccc(CO)cc2)cc1] | 5.8 |
| β4 | 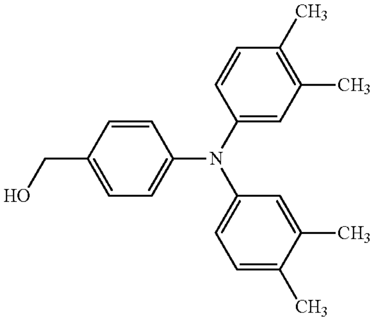 [SMILES: Cc1ccc(N(c2ccc(CO)cc2)c2ccc(C)c(C)c2)cc1C] | 5.9 |
| α10 | 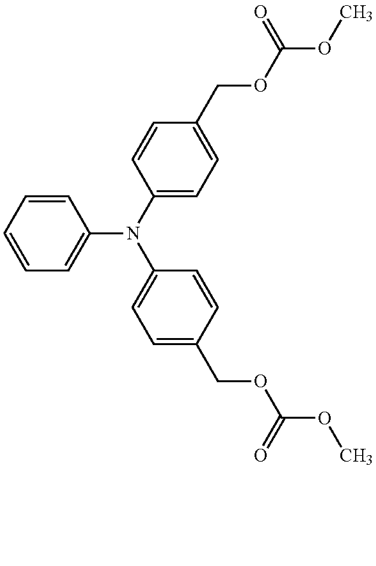 [SMILES: COC(=O)OCc1ccc(N(c2ccccc2)c2ccc(COC(=O)OC)cc2)cc1] | 6.0 |

TABLE 1-2-continued

| Compound | Structure | Ipα[eV] or Ipβ[eV] |
|---|---|---|
| β5 | 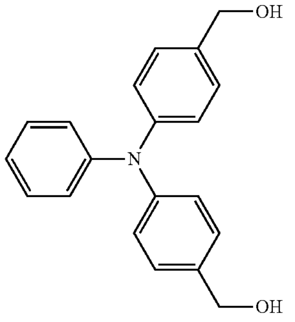 [SMILES: OCc1ccc(N(c2ccccc2)c2ccc(CO)cc2)cc1] | 6.1 |
| α11 | 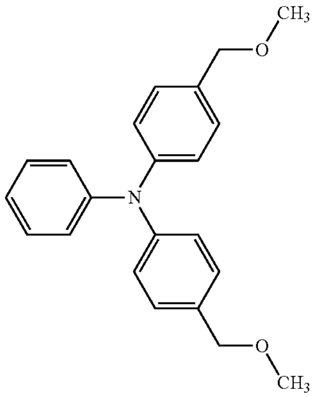 [SMILES: COCc1ccc(N(c2ccccc2)c2ccc(COC)cc2)cc1] | 6.1 |

In order to obtain the effect of hole injection from the support to the undercoat layer more efficiently, the ionization potential IPα of the compound (α) represented by formula (α) and the ionization potential IPβ of the compound (β) represented by formula (β) are 5.0 to 5.9 eV and preferably 5.0 to 5.5 eV.

The measurement of the ionization potential in the present disclosure is carried out under a nitrogen atmosphere using a photoelectron spectrometer AC-3 produced by RIKEN INSTRUCTION CO., LTD.

The undercoat layer in the present disclosure preferably contains a cured product of a composition containing a compound represented by formula (B1) or (B2).

(B1)

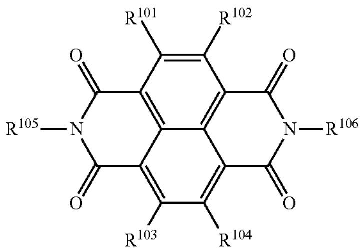

-continued (B2)

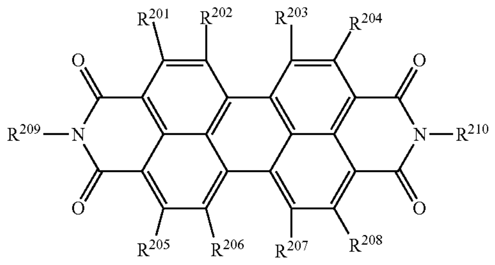

In formulae (B1) and (B2), $R^{101}$ to $R^{106}$ and $R^{201}$ to $R^{210}$ each independently denote a monovalent group represented by formula (C), a hydrogen atom, a cyano group, a nitro group, a halogen atom, an alkoxycarbonyl group, a substituted or unsubstituted alkyl group, a substituted or unsubstituted aryl group, or a substituted or unsubstituted heterocyclic group. Provided that, at least one of $R^{101}$ to $R^{106}$ and at least one of $R^{201}$ to $R^{210}$ are monovalent groups represented by formula (C). One of the $CH_2$s of the alkyl group may be substituted with O or S, or one of the CHs of the alkyl group may be substituted with N. A substituent of the substituted alkyl group is at least one group selected from a group consisting of an aryl group, an alkoxycarbonyl group, a halogen atom, and a hydroxy group. A substituent of the substituted aryl group and a substituent of the substituted heterocyclic group are at least one group selected from a group consisting of a halogen atom, a nitro group, a cyano group, an alkyl group, an alkyl group substituted with halogen group, and an alkoxy group.

$$-(a)_l-(b)_m-c \qquad (C)$$

In formula (C), at least one of a, b, and c comprises at least one group selected from a group consisting of a hydroxy group, a thiol group, an amino group, and a carboxy group. l and m are each independently 0 or 1, and the sum of l and m is 0 to 2.

a denotes an alkylene group having 1 to 6 carbon atoms in a main chain, an alkylene group having 1 to 6 carbon atoms in the main chain substituted with an alkyl group having 1 to 6 carbon atoms, an alkylene group having 1 to 6 carbon atoms in the main chain substituted with a benzyl group, an alkylene group having 1 to 6 carbon atoms in the main chain substituted with an alkoxycarbonyl group, or an alkylene group having 1 to 6 carbon atoms in the main chain substituted with a phenyl group, and these alkylene groups may comprise at least one group selected from a group consisting of a hydroxy group, a thiol group, an amino group, and a carboxy group as a substituent. One of the $CH_2$s in the main chain of these alkylene groups may be substituted with O or S, or one of the CHs in the main chain of these alkylene groups may be substituted with N.

b denotes a phenylene group, a phenylene group substituted with an alkyl group having 1 to 6 carbon atoms, a phenylene group substituted with a nitro group, a phenylene group substituted with a halogen group, or a phenylene group substituted with an alkoxy group, and these phenylene groups may comprise at least one group selected from a group consisting of a hydroxy group, a thiol group, an amino group, and a carboxy group as a substituent.

c denotes a hydrogen atom, a carboxy group, an alkyl group having 1 to 6 carbon atoms in the main chain, or an alkyl group having 1 to 6 carbon atoms in the main chain substituted with an alkyl group having 1 to 5 carbon atoms, and these alkyl groups may comprise at least one group selected from a group consisting of a hydroxy group, a thiol group, an amino group, and a carboxy group as a substituent.

The compound selected from a group consisting of a compound represented by formula (B1) and a compound represented by formula (B2) may be used as only one or two or more compounds in combination.

(Compounds of formula (B1) and formula (B2))

Compounds of formula (B1) and formula (B2) are electron transporting substances. Compounds of formula (B1) and formula (B2) are shown in Tables 2-1 to 2-7.

Compounds (B101) to (B179) are specific examples of compounds of formula (B1) and compounds (B201) to (B231) are specific examples of compounds of formula (B2). In Table 2, when c is described as "(H)," it means that c is a hydrogen atom in the structure indicated in column a or b and the structure of formula (β) is the structure indicated in column a or b. When column a or b is (–), it means that l or m is 0.

The following is a specific example, and the effect of the present disclosure is not caused only by the following specific example. These compounds may be used alone or in combination.

TABLE 2-1

| Com- | | | | | | | (C) | | |
|---|---|---|---|---|---|---|---|---|---|
| pound | $R^{101}$ | $R^{102}$ | $R^{103}$ | $R^{104}$ | $R^{105}$ | $R^{106}$ | a | b | c |
| B101 | H | H | H | H | 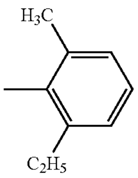 | (C) | 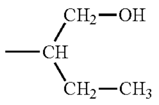 | — | (H) |
| B102 | H | H | H | H | 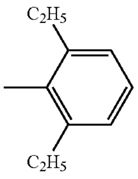 | (C) | 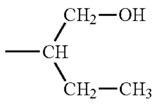 | — | (H) |
| B103 | H | H | H | H | 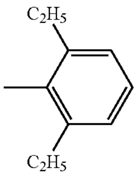 | (C) | — | 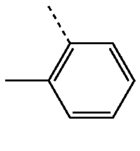 | 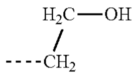 |

TABLE 2-1-continued
| Compound | $R^{101}$ | $R^{102}$ | $R^{103}$ | $R^{104}$ | $R^{105}$ | $R^{106}$ | (C) a | (C) b | (C) c |
|---|---|---|---|---|---|---|---|---|---|
| B104 | H | H | H | H | 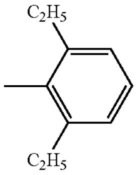 | (C) | — | 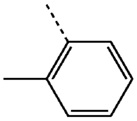 | ----$\underset{H_2}{C}$—OH |
| B105 | H | H | H | H | 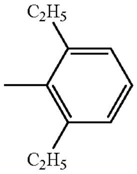 | (C) | — | 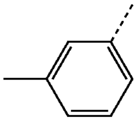 | ----$\underset{H_2}{C}$—OH |
| B106 | H | H | H | H | 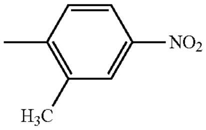 | (C) | 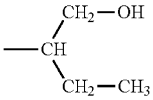 | — | (H) |
| B107 | H | H | H | H | 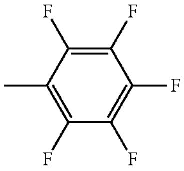 | (C) | 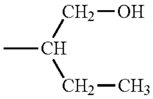 | — | (H) |
| B108 | H | H | H | H | 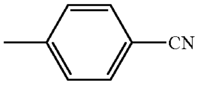 | (C) | 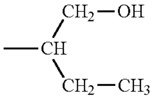 | — | (H) |
| B109 | H | H | H | H | 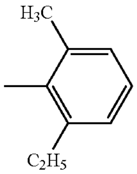 | (C) | $-(CH_2)_5-OH$ | — | (H) |
| B110 | H | H | H | H | $-(CH_2)_6-H$ | (C) | 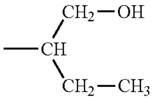 | — | (H) |
| B111 | H | H | H | H | 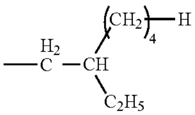 | (C) | — | 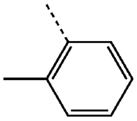 | 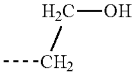 |
| B112 | H | H | H | H | 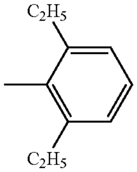 | (C) | — | 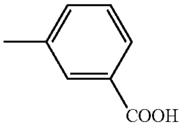 | (H) |

TABLE 2-1-continued
| Compound | $R^{101}$ | $R^{102}$ | $R^{103}$ | $R^{104}$ | $R^{105}$ | $R^{106}$ | (C) a | (C) b | (C) c |
|---|---|---|---|---|---|---|---|---|---|
| B113 | H | H | H | H | 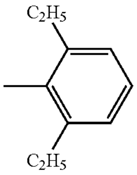 | (C) | — | 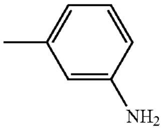 | (H) |
| B114 | H | H | H | H | 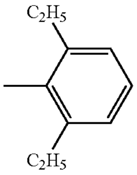 | (C) | — | 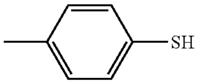 | (H) |
| B115 | H | H | H | H | 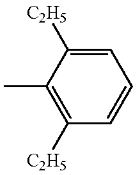 | (C) | 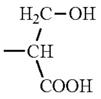 | — | (H) |
TABLE 2-2
| Compound | $R^{101}$ | $R^{102}$ | $R^{103}$ | $R^{104}$ | $R^{105}$ | $R^{106}$ | (C) a | (C) b | (C) c |
|---|---|---|---|---|---|---|---|---|---|
| B116 | H | H | H | H | 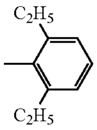 | (C) | — | 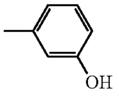 | (H) |
| B117 | H | H | H | H | 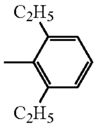 | (C) | — |  | 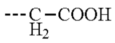 |
| B118 | 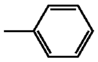 | H | H | 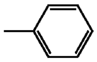 | 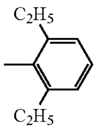 | (C) | 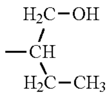 | — | (H) |
| B119 | CN | H | H | CN | 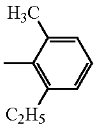 | (C) | 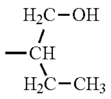 | — | (H) |
| B120 | (C) | H | H | H | 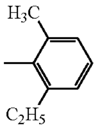 | 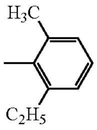 | — | — | —COOH |

TABLE 2-2-continued
| Compound | $R^{101}$ | $R^{102}$ | $R^{103}$ | $R^{104}$ | $R^{105}$ | $R^{106}$ | (C) | | |
|---|---|---|---|---|---|---|---|---|---|
| | | | | | | | a | b | c |
| B121 | H | $NO_2$ | H | $NO_2$ | 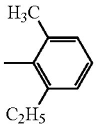 | (C) | 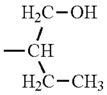 | — | (H) |
| B122 | H | H | H | H | 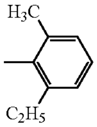 | (C) | 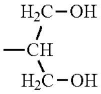 | — | (H) |
| B123 | H | $NO_2$ | H | $NO_2$ | (C) | (C) | 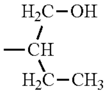 | — | (H) |
| B124 | H | H | H | H | (C) | (C) | — | 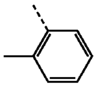 | 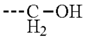 |
| B125 | H | H | H | H | (C) | (C) | — | 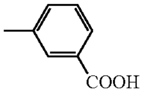 | (H) |
| B126 | H | H | H | H | (C) | (C) | — | 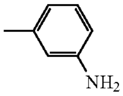 | (H) |
| B127 | H | H | H | H | (C) | (C) | — | 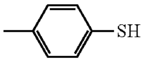 | (H) |
| B128 | H | H | H | H | (C) | (C) | 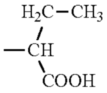 | — | (H) |
| B129 | H | H | H | H | (C) | (C) | — | 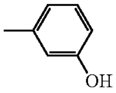 | (H) |
| B130 | H | H | H | H | 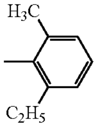 | (C) | 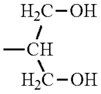 | — | (H) |
| B132 | H | H | H | H | 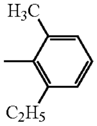 | (C) | 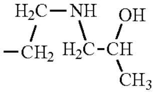 | — | (H) |

TABLE 2-3
| Compound | $R^{101}$ | $R^{102}$ | $R^{103}$ | $R^{104}$ | $R^{105}$ | $R^{106}$ | (C) a | (C) b | (C) c |
|---|---|---|---|---|---|---|---|---|---|
| B133 | H | H | H | H | 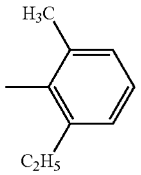 | (C) | 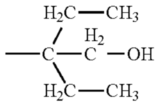 | — | (H) |
| B134 | H | H | H | H | (C) | (C) | 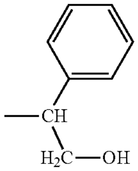 | — | (H) |
| B135 | H | H | H | H | (C) | (C) | 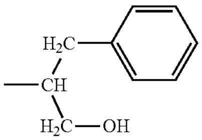 | — | (H) |
| B136 | H | H | H | H | (C) | (C) | 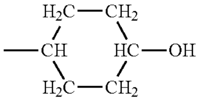 | — | (H) |
| B138 | H | H | H | H | 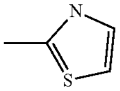 | (C) | 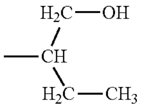 | — | (H) |
| B139 | H | H | H | H | 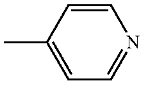 | (C) | 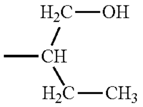 | — | (H) |
| B140 | H | H | H | H | 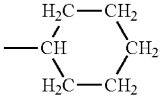 | (C) | | — | (H) |
| B141 | H | H | H | H | (C) | (C) | 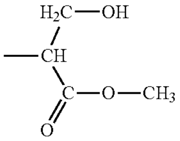 | — | (H) |
| B142 | CN | H | H | CN | 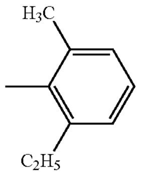 | (C) | 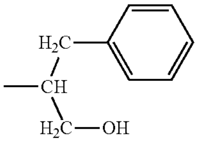 | — | (H) |
| B143 | H | H | H | H | 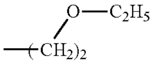 | (C) | 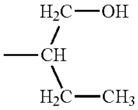 | — | (H) |
| B144 | H | H | H | H | 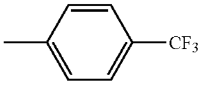 | (C) | 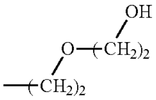 | — | (H) |

TABLE 2-3-continued
| Compound | R101 | R102 | R103 | R104 | R105 | R106 | (C) a | (C) b | (C) c |
|---|---|---|---|---|---|---|---|---|---|
| B145 | H | H | H | H | (C) | (C) | 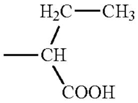 | — | (H) |
| B146 | H | H | H | H | 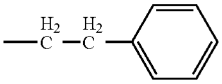 | (C) | 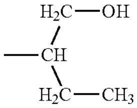 | — | (H) |
| B147 | H | H | H | H | 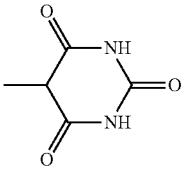 | (C) | 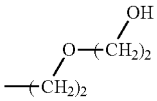 | — | (H) |
| B148 | H | H | H | H | 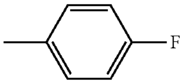 | (C) | 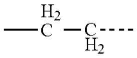 | 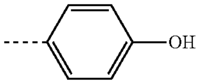 | (H) |
| B149 | H | H | H | H | 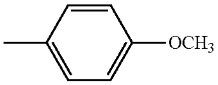 | (C) | — | 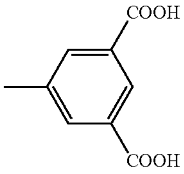 | (H) |
TABLE 2-4
| Compound | R101 | R102 | R103 | R104 | R105 | R106 | (C) a | (C) b | (C) c | (C') a | (C') b | (C') c |
|---|---|---|---|---|---|---|---|---|---|---|---|---|
| B150 | H | H | H | H | (C) | (C') | 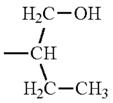 | — | (H) | — | 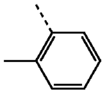 | 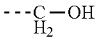 |
| B151 | H | H | H | H | (C) | (C') | — | 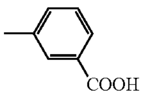 | (H) | 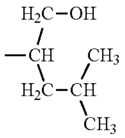 | — | (H) |
TABLE 2-5
| Compound | R101 | R102 | R103 | R104 | R105 | R106 | © a | © b | © c |
|---|---|---|---|---|---|---|---|---|---|
| B152 | H | H | H | H | 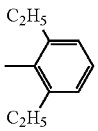 | (C) | 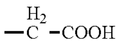 | — | (H) |

TABLE 2-5-continued
| Compound | $R^{101}$ | $R^{102}$ | $R^{103}$ | $R^{104}$ | $R^{105}$ | $R^{106}$ | © a | © b | © c |
|---|---|---|---|---|---|---|---|---|---|
| B153 | H | H | H | H | 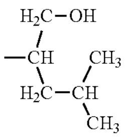 | (C) | — | 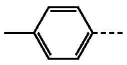 | 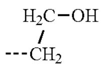 |
| B154 | H | H | H | H | 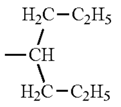 | (C) | 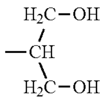 | — | (H) |
| B155 | H | H | H | H | (C) | (C) | 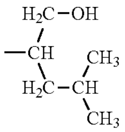 | — | (H) |
| B156 | H | H | H | H | (C) | (C) | 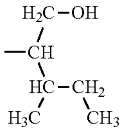 | — | (H) |
| B157 | H | H | H | H | (C) | (C) | 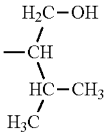 | — | (H) |
| B158 | H | H | H | H | 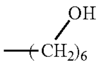 | (C) | 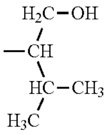 | — | (H) |
| B159 | H | H | H | H | 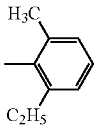 | (C) | 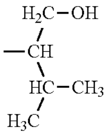 | — | (H) |
| B160 | H | H | H | H | (C) | (C) | 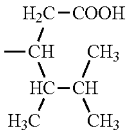 | — | (H) |
| B161 | H | H | H | H | 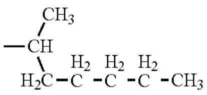 | (C) | 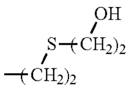 | — | (H) |
| B162 | H | H | H | H | (C) | (C) | 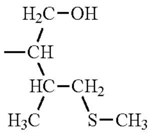 | — | (H) |
| B163 | H | H | H | H | (C) | (C) | 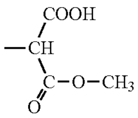 | — | (H) |

TABLE 2-5-continued
| Com- | | | | | | | © | | |
|---|---|---|---|---|---|---|---|---|---|
| pound | $R^{101}$ | $R^{102}$ | $R^{103}$ | $R^{104}$ | $R^{105}$ | $R^{106}$ | a | b | c |
| B164 | H | H | H | H | 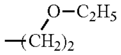 | (C) | 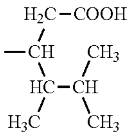 | — | (H) |
| B165 | H | H | H | H | 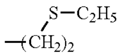 | (C) | 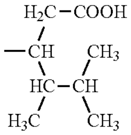 | — | (H) |
| B166 | H | H | H | H | 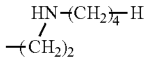 | (C) | 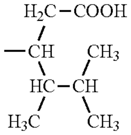 | — | (H) |
| B167 | H | H | H | H | 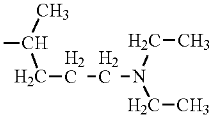 | (C) | 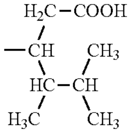 | — | (H) |
| B168 | H | H | H | H | 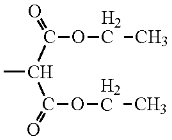 | (C) | 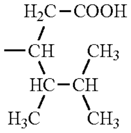 | — | (H) |
TABLE 2-6
| Com- | | | | | | | | | | | (C) | | |
|---|---|---|---|---|---|---|---|---|---|---|---|---|---|
| pound | $R^{201}$ | $R^{202}$ | $R^{203}$ | $R^{204}$ | $R^{205}$ | $R^{206}$ | $R^{207}$ | $R^{208}$ | $R^{209}$ | $R^{210}$ | a | b | c |
| B201 | H | H | H | H | H | H | H | H | 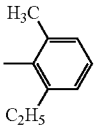 | (C) | 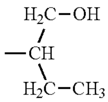 | — | (H) |
| B202 | H | H | H | H | H | H | H | H | 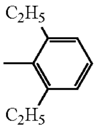 | (C) | 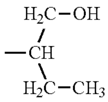 | — | (H) |
| B203 | H | H | H | H | H | H | H | H | 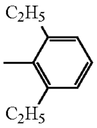 | (C) | — | 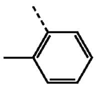 | 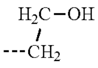 |
| B204 | H | H | H | H | H | H | H | H | 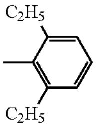 | (C) | — | 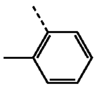 | 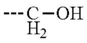 |

TABLE 2-6-continued
| Com-pound | $R^{201}$ | $R^{202}$ | $R^{203}$ | $R^{204}$ | $R^{205}$ | $R^{206}$ | $R^{207}$ | $R^{208}$ | $R^{209}$ | $R^{210}$ | (C) a | b | c |
|---|---|---|---|---|---|---|---|---|---|---|---|---|---|
| B205 | H | H | H | H | H | H | H | H | 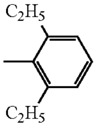 | (C) | — | 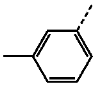 | 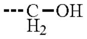 |
| B206 | H | H | H | H | H | H | H | H | 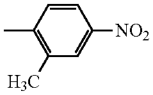 | (C) | 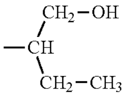 | — | (H) |
| B207 | H | H | H | H | H | H | H | H | 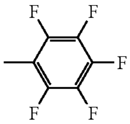 | (C) | 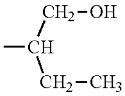 | — | (H) |
| B208 | H | H | H | H | H | H | H | H | 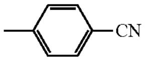 | (C) | 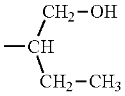 | — | (H) |
| B209 | H | H | H | H | H | H | H | H | 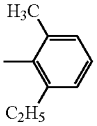 | (C) | 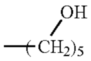 | — | (H) |
| B210 | H | H | H | H | H | H | H | H | $-(CH_2)_6-H$ | (C) | 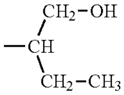 | — | (H) |
| B211 | H | H | H | H | H | H | H | H | 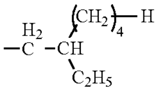 | (C) | — | 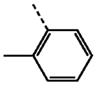 | 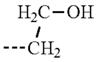 |
| B212 | H | H | H | H | H | H | H | H | 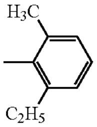 | (C) | — | 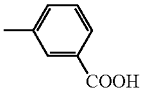 | (H) |
| B213 | H | H | H | H | H | H | H | H | 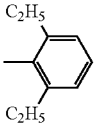 | (C) | — | 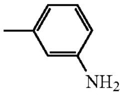 | (H) |
| B214 | H | H | H | H | H | H | H | H | 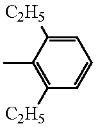 | (C) | — | 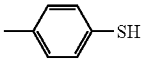 | (H) |
| B215 | H | H | H | H | H | H | H | H | 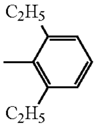 | (C) | 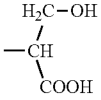 | — | (H) |

TABLE 2-7
| Com-pound | $R^{201}$ | $R^{202}$ | $R^{203}$ | $R^{204}$ | $R^{205}$ | $R^{206}$ | $R^{207}$ | $R^{208}$ | $R^{209}$ | $R^{210}$ | (C) a | (C) b | (C) c |
|---|---|---|---|---|---|---|---|---|---|---|---|---|---|
| B216 | H | H | H | H | H | H | H | H | 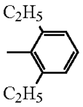 | (C) | 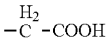 | — | (H) |
| B217 | H | H | H | H | H | H | H | H | 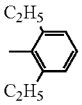 | (C) | — | 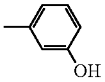 | (H) |
| B218 | H | H | H | H | H | H | H | H | 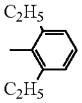 | (C) | — |  | 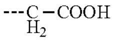 |
| B219 | H | CN | H | H | H | H | CN | H | 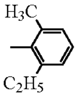 | (C) | 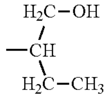 | — | (H) |
| B220 | H | 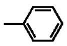 | H | H | H | H | 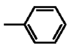 | H | 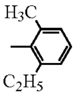 | (C) | 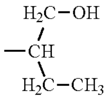 | — | (H) |
| B221 | H | (C) | H | H | H | H | H | H | 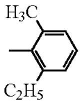 | 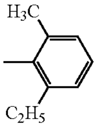 | — | — | —COOH |
| B222 | H | Cl | Cl | H | H | Cl | Cl | H | 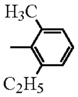 | (C) | 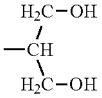 | — | (H) |
| B223 | H | H | H | H | H | H | H | H | 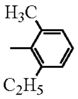 | (C) | 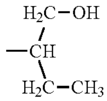 | — | (H) |
| B224 | H | H | H | H | H | H | H | H | (C) | (C) | 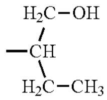 | — | (H) |
| B225 | H | H | H | H | H | H | H | H | (C) | (C) | — | 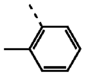 | 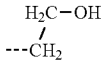 |
| B226 | H | H | H | H | H | H | H | H | (C) | (C) | — | 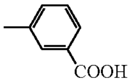 | (H) |
| B227 | H | H | H | H | H | H | H | H | (C) | (C) | — | 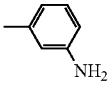 | (H) |
| B228 | H | H | H | H | H | H | H | H | (C) | (C) | — | 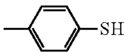 | (H) |
| B229 | H | H | H | H | H | H | H | H | (C) | (C) | 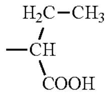 | — | (H) |

TABLE 2-7-continued

| Com- | | | | | | | | | | | (C) | | |
|---|---|---|---|---|---|---|---|---|---|---|---|---|---|
| pound | $R^{201}$ | $R^{202}$ | $R^{203}$ | $R^{204}$ | $R^{205}$ | $R^{206}$ | $R^{207}$ | $R^{208}$ | $R^{209}$ | $R^{210}$ | a | b | c |
| B230 | H | H | H | H | H | H | H | H | (C) | (C) | — | 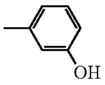 | (H) |
| B231 | H | H | H | H | H | H | H | H | 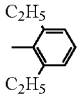 | (C) | — | 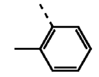 | 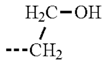 |

The structure of the monovalent group represented by formula (C) in the above table can be the following.

That is, the monovalent group represented by formula (C) is an alkyl group having 1 to 12 carbon atoms, a phenyl group, or a phenylalkyl group having 6 to 12 carbon atoms, both of which may have substituents. Provided that, the substituents of the alkyl group having 1 to 12 carbon atoms may comprise any of a hydroxy group, a thiol group, an amino group, a carboxy group, an alkoxycarbonyl group, or an alkoxy group, and the substituents which the phenyl group or the phenylalkyl group having 6 to 12 carbon number may have are a methyl group, an ethyl group, a hydroxymethyl group, a hydroxyethyl group, a carboxymethyl group, a carboxyethyl group, a hydroxy group, a thiol group, an amino group, a carboxy group, an alkoxycarbonyl group, and in the alkyl group of the alkyl group having 1 to 12 carbon number or the phenylalkyl group having 6 to 12 carbon number, one $CH_2$ may be substituted with O or S, or one CH may be substituted with N, and provided that the monovalent group represented by formula (C) comprises either a hydroxy group, a thiol group, an amino group or a carboxy group.

The value of the mass ratio of the content of the compound (α) in the composition to the content of the compound represented by formula (B1) or (B2) in the composition is preferably 0.035 to 0.100. That is, the content of the compound (α) is preferably 3.5 to 10 mass % with respect to the compound represented by formula (B1) or (B2).

Furthermore, the value of the mass ratio of the content of the compound (β) in the composition to the content of the compound represented by formula (B1) or (B2) in the composition is preferably 0.035 to 0.100. That is, the content of the compound (β) is preferably 3.5 to 10 mass % with respect to the compound represented by formula (B1) or (B2).

The undercoat layer may contain as a resin, a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, a cellulose resin, and so on.

In addition, the undercoat layer may further contain a metal oxide particle, a metal particle, an electroconductive polymer, and the like for the purpose of improving electric characteristics.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has a thickness of preferably from 0.2 to 2.4 μm.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member is mainly classified into (1) a laminate-type photosensitive layer and (2) a monolayer-type photosensitive layer. (1) The laminate-type photosensitive layer is a photosensitive layer having a charge generating layer containing a charge generating substance and a charge transporting layer containing a charge transporting substance. (2) The monolayer-type photosensitive layer is a photosensitive layer containing both a charge generating substance and a charge transporting substance.

(1) Laminate-Type Photosensitive Layer

The laminate-type photosensitive layer comprise the charge generating layer and the charge transporting layer.

(1-1) Charge Generating Layer

The charge generating layer preferably contains the charge generating substance and a resin (binder resin).

Examples of the charge generating substance include an azo pigment, a perylene pigment, a polycyclic quinone pigment, an indigo pigment, and a phthalocyanine pigment. Of those, the azo pigment and the phthalocyanine pigment are preferred. Of the phthalocyanine pigment, an oxytitanium phthalocyanine pigment, a chlorogallium phthalocyanine pigment, and a hydroxygallium phthalocyanine pigment are preferred.

The content of the charge generating substance in the charge generating layer is preferably from 40 to 85 mass %, more preferably from 60 to 80 mass % with respect to the total mass of the charge generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge generating layer may further contain an additive, such as an antioxidant or a UV absorber. Specific examples thereof include a hindered phenol compound, a hindered amine compound, a sulfur compound, a phosphorus compound, and a benzophenone compound.

The charge generating layer has a thickness of preferably from 0.1 to 1 μm, more preferably from 0.15 to 0.4 μm.

The charge generating layer may be formed by preparing a coating liquid for a charge generating layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge Transporting Layer

The charge transporting layer preferably contains the charge transporting substance and a resin (binder resin).

Examples of the charge transporting substance include a polycyclic aromatic compound, a heterocyclic compound, a hydrazone compound, a styryl compound, an enamine compound, a benzidine compound, a triarylamine compound, and a resin having a group derived from each of these substances. Of those, a triarylamine compound and a benzidine compound are preferred.

The content of the charge transporting substance in the charge transporting layer is preferably from 25 to 70 mass %, more preferably from 30 to 55 mass % with respect to the total mass of the charge transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge transporting substance and the resin is preferably from 4:10 to 20:10, more preferably from 5:10 to 12:10.

In addition, the charge transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The charge transporting layer has a thickness of preferably from 5 to 50 μm, more preferably from 8 to 40 μm, particularly preferably from 10 to 30 μm.

The charge transporting layer may be formed by preparing a coating liquid for a charge transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

<Protective Layer>

In the present disclosure, a protective layer may be arranged on the photosensitive layer. The arrangement of the protective layer can improve durability.

The protective layer preferably contains electroconductive particles and/or a charge transporting substance, and a resin.

Examples of the electroconductive particles include particles of metal oxides and metals. Examples of the metal oxide includes titanium oxide, zinc oxide, tin oxide, and indium oxide.

Examples of the charge transporting substance include a polycyclic aromatic compound, a heterocyclic compound, a hydrazone compound, a styryl compound, an enamine compound, a benzidine compound, a triarylamine compound, and a resin having a group derived from each of these substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. As a polymerizarion reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge transporting ability may be used as the monomer having a polymerizable functional group.

The protective layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protective layer has a thickness of preferably from 0.5 to 10 μm, more preferably from 1 to 7 μm.

The protective layer may be formed by preparing a coating liquid for a protective layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge according to the present disclosure is characterized in that the process cartridge integrally supports the electrophotographic photosensitive member described above and at least one unit selected from the group consisting of: a charging unit: a developing unit; and a cleaning unit, and is removably mounted onto the main body of an electrophotographic apparatus.

In addition, an electrophotographic apparatus according to the present disclosure is characterized by including the electrophotographic photosensitive member described above, a charging unit, an exposing unit, a developing unit, and a transferring unit.

An example of the schematic configuration of an electrophotographic apparatus including a process cartridge including an electrophotographic photosensitive member is illustrated in FIG. 1.

An electrophotographic photosensitive member 1 having a cylindrical shape is rotationally driven about a shaft 2 in a direction indicated by the arrow at a predetermined peripheral speed. The surface of the electrophotographic photosensitive member 1 is charged to a predetermined positive or negative potential by a charging unit 3.

Although a roller charging system based on a roller-type charging member is illustrated in FIG. 1, a charging system, such as a corona charging system, a contact charging system, or an injection charging system, may be adopted.

The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to treatment for fixing the toner image, and is printed out to the outside of the electrophotographic apparatus.

The electrophotographic apparatus may include a cleaning unit 9 for removing a deposit such as the toner remaining on the surface of the electrophotographic photosensitive member 1 after the transfer. In addition, a so-called cleanerless system in which the deposit is removed with the developing unit 5 or the like without separate arrangement of the cleaning unit 9 may be used.

The electrophotographic apparatus may include an electricity-removing mechanism for subjecting the surface of the electrophotographic photosensitive member 1 to electricity-removing treatment with pre-exposure light 10 from a pre-exposing unit (not shown). In addition, a guiding unit 12 such as a rail may be arranged for removably mounting a process cartridge 11 according to the present disclosure onto the main body of the electrophotographic apparatus.

The electrophotographic photosensitive member according to the present disclosure can be used in, for example, a laser beam printer, an LED printer, a copying machine, a facsimile, and a multifunctional peripheral thereof.

EXAMPLES

The present disclosure is described in more detail below by way of Examples and Comparative Examples. The present disclosure is by no means limited to the following Examples, and various modifications may be made without departing from the gist of the present disclosure. In the description in the following Examples, "part(s)" is by mass unless otherwise specified.

[Production Examples of Compound of Formula (B1) and Compound of Formula (B2)]

The compound represented by formula (B1) (a derivative of an electron transporting substance) can be synthesized using known synthetic methods described, for example, in U.S. Pat. Nos. 4,442,193, 4,992,349, 5,468,583, Chemistry of materials, Vol. 19, No. 11, 2703-2705(2007). It can also be synthesized by reacting a monoamine derivative with naphthalenetetracarboxylic acid dianhydride, which is available from Tokyo Kasei Kogyo Co., Ltd., Sigma Aldrich Japan Co., Ltd., and Johnson Massey Japan Incorporated.

The compound represented by formula (B1) has a polymerizable functional group (hydroxy, thiol, amino, and carboxy groups) that can be polymerized with an isocyanate group of an isocyanate compound. Methods for introducing these substituents into the compound represented by formula (B1) include introducing a polymerizable functional group directly into the compound represented by formula (B1) and introducing a structure with a functional group that can be a precursor of the above polymerizable functional group or polymerizable functional group. A method described later includes, for example, introducing an aryl group containing a functional group based on a halide of a naphthylimide derivative through a cross-coupling reaction using a palladium catalyst and a base. A method also includes, for example, introducing an alkyl group containing a functional group based on a halide of a naphthylimide derivative through a cross-coupling reaction using a $FeCl_3$ catalyst and a base. A method also includes, for example, introducing a hydroxyalkyl group or a carboxy group based on a halide of a naphthylimide derivative through lithiation followed by the action of an epoxy compound or $CO_2$. As a raw material for synthesizing a naphthylimide derivative, a naphthalenetetracarboxylic dianhydride derivative or a monoamine derivative having the above polymerizable functional group or a functional group that can be a precursor of the polymerizable functional group can be used.

The compound of formula (B2) (derivative of electron transporting substance) can be synthesized using known synthetic methods described, for example, in the Journal of the American chemical society, Vol. 129, No. 49, 15259-15278(2007). They can also be synthesized by the reaction of a monoamine derivative with perylenetetracarboxylic dianhydride, which is available as a reagent from Tokyo Chemical Industry Co., Ltd., Sigma Aldrich Japan Co., Ltd. and Johnson Massey Japan Inc.

The compound represented by formula (B2) has an isocyanate group of an isocyanate compound and a polymerizable functional group (hydroxy, thiol, amino, and carboxy groups). Methods for introducing these polymerizable functional groups into the compound represented by formula (B2) include the direct introduction of the polymerizable functional group into the compound represented by formula (B2) and the introduction of a structure having a functional group that can be a precursor of the above polymerizable functional group or polymerizable functional group. The methods described below include, for example, the use of a palladium-catalyzed cross-coupling reaction with a base based on a halide of a peryleneimide derivative. The method also includes, for example, the use of a $FeCl_3$-catalyzed cross-coupling reaction with a base based on a halide of a peryleneimide derivative. The method also includes the use of a perylenetetracarboxylic dianhydride derivative or a monoamine derivative having the polymerizable functional group or a functional group that can be a precursor of the polymerizable functional group as a raw material for the synthesis of a peryleneimide derivative.

Synthesis Example 1

A solution was prepared by adding 5.4 parts of naphthalenetetracarboxylic acid dianhydride, 4 parts of 2-methyl-6-ethylaniline and 3 parts of 2-amino-1-butanol to 200 parts of dimethylacetamide under nitrogen atmosphere and stirring at room temperature for 1 hour. After the solution was prepared, reflux was performed for 8 hours, the precipitates were filtered and recrystallized with ethyl acetate to obtain 1.0 parts of compound B101.

Synthesis Example 2

A solution was prepared by adding 5.4 parts of naphthalenetetracarboxylic acid dianhydride, 4 parts of 4-heptylamine and 3 parts of 2-amino-1, 3-propanediol to 200 parts of dimethylacetamide under nitrogen atmosphere and stirring at room temperature for 1 hour. The solution was prepared, refluxed for 8 hours, separated by silica gel column chromatography (developed solvent: ethyl acetate/toluene), and then concentrated into fractions containing the desired product. The concentrate was recrystallized in a mixed solution of ethyl acetate/toluene to obtain 2.0 parts of compound B154.

Synthesis Example 3

A solution was prepared by adding 7.4 parts of perylenetetracarboxylic acid dianhydride (produced by Tokyo Chemical Industry Co., Ltd.), 4 parts of 2,6-diethylaniline (produced by Tokyo Chemical Industry Co., Ltd.) and 4 parts of 2-aminophenylethanol to 200 parts of dimethylacetamide under a nitrogen atmosphere and stirring at room temperature for 1 hour. The solution was prepared and refluxed for 8 hours, the precipitates were filtered and recrystallized with ethyl acetate to obtain 5.0 parts of compound B203.

<Production of Electrophotographic Photosensitive Member>

(Production Example of Photosensitive Member 1)

Aluminum cylinder (JIS-A3003, Aluminum alloy) with 370 mm in length and 30.5 mm in diameter was used as support (electroconductive support).

Next, 100 parts of (T1-1) niobium-doped titanium oxide particle, 80 parts of phenolic resin (Trade name: Plyorphen J-325, DIC, Resin solids: 60 mass %) as resin, and 60 parts of 1-methoxy-2-propanol, which were produced by the method described in Japanese Patent Application Laid-Open No. 2020-20919, were put into a Sand mill using 200 parts of glass beads with 0.8 mm diameter, and the dispersion was prepared by performing dispersion treatment at a speed of 1500 rpm, a dispersion treatment time of 4 hours, and a dispersion temperature of 23±3° C. From this dispersion, the glass beads were removed with a mesh (opening: 150 microns).

After the glass beads were removed, 0.015 parts of silicone oil (Trade name: SH28PAINTADDITIVE, produced by Toray Dow Corning) and 15 parts of silicone resin particle (Trade name: Tospearl 120, produced by Momentive Performance Materials, Average primary particle diameter: 2 μm, Density: 1.3 g/cm$^3$) were added as leveling agents to the dispersion. A coating solution for the electroconductive layer was also prepared by adding silicone oil to the dispersion and stirring it so that the total mass of the metal oxide particle and the binder resin in the dispersion was 0.01 mass %. The coating solution for the electroconductive layer was applied onto the support by dip coating to form a coating film, and the resulting coating film was dried and thermally cured at 150° C. for 30 minutes to form an electroconductive layer with a thickness of 18 μm. The silicone resin particle used was Tospearl 120 (average particle diameter 2 μm) produced by Momentive Performance Materials Japan GK. The silicone oil used was SH28 PA produced by Dow Corning Toray.

Next, 3.11 parts of compound (B154) as an electron transport material, 0.40 parts of styrene-acrylic resin (Trade name: UC-3920, Toa Gosei) as a resin, 0.4 parts of polyvinyl butyral resin (Trade name: BX-1, produced by Sekisui Chemical Co., Ltd.), and 6.49 parts of blocked isocyanate compound (Trade name: SBB-70P, produced by Asahi Kasei) as an isocyanate compound were dissolved in a mixed solvent of 48 parts of 1-butanol and 24 parts of acetone. To this solution, 0.16 parts of compound (A1) (produced by Tokyo Chemical Industries) dissolved in 6 parts of tetrahydrofuran and 1.8 parts of silica slurry (Trade name: IPA-ST-UP, produced by Nissan Chemical Industries, Solid content: 15 mass %, Viscosity: 9 mPa/s) dispersed in isopropyl alcohol were added and stirred for 1 hour. After that, filtration under pressure was performed using a Teflon® filter (trade name: PF020) produced by ADVANTEC. The resulting coating solution for the undercoat layer was applied to the above electroconductive layer by immersion, and the resulting coating film was heated at 170° C. for 40 minutes to cure (polymerize), thereby forming an undercoat layer with a thickness of 1.0 μm on the electroconductive layer.

Next, the following materials were prepared.

| | |
|---|---|
| A hydroxygallium phthalocyanine crystal (charge generating substance) of a crystal form having peaks at Bragg angles 2θ ± 0.2° of 7.4° and 28.2° in CuKα characteristic X-ray diffraction | 20 parts |
| A calixarene compound represented by the following formula (P) | 0.2 part |
| Polyvinyl butyral (trade name: S-LEC BX-1, produced by Sekisui Chemical Company, Limited) | 10 parts |
| Cyclohexanone | 600 parts |

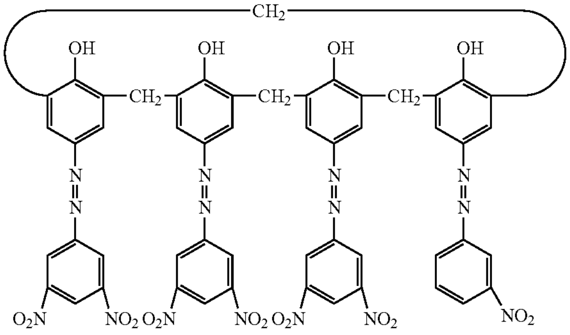

(P)

Those materials were loaded into a sand mill using glass beads each having a diameter of 1 mm, and the mixture was subjected to dispersion treatment for 4 hours. After that, 700 parts of ethyl acetate was added to the dispersed product to prepare a coating liquid for a charge generating layer. The coating liquid for a charge generating layer was applied onto the undercoat layer by dip coating, and the resultant coat was dried for 15 minutes at 80° C. to form a charge generating layer having a thickness of 0.17 μm.

Then, 30 parts of a compound represented by formula (Q) (a charge transporting substance), 60 parts of a compound represented by formula (R) (a charge transporting substance) and 10 parts of a compound represented by formula (S) (a charge transporting substance), (Q)

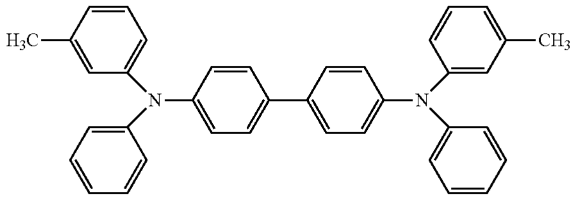

(R)

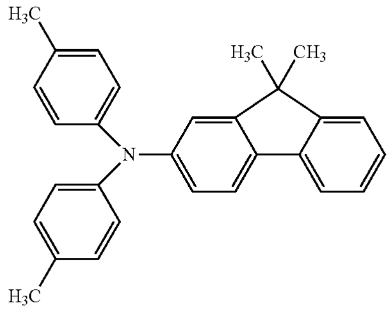

(S)

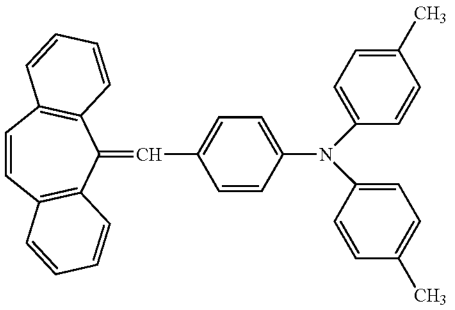

and 100 parts polycarbonate resin (Trade name: Eupiron Z400, Bisphenol Z type polycarbonate produced by Mitsubishi Engineering Plastics Co., Ltd.) and 0.02 parts polycarbonate resin represented by formula (T) (viscosity average molecular weight Mv: 20,000), (T)

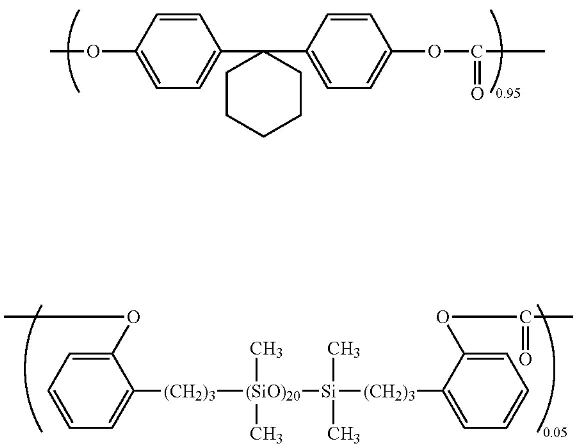

(In formula (T), 0.95 and 0.05 are the molar ratio (copolymerization ratio) of the 2 units.) were dissolved in a mixed solvent of 600 parts mixed xylene and 200 parts dimethoxymethane to prepare a coating solution for the charge transporting layer. The coating liquid for a charge transporting layer was applied onto the charge generating layer by dip coating to form a coat, and the resultant coat was dried for 30 minutes at 100° C. to form a charge transporting layer having a thickness of 18 μm.

Next, a mixed solvent of 20 parts of 1,1,2,2,3,3,4-heptafluorocyclopentane (trade name: ZEORORA H, produced by Zeon Corporation) and 20 parts of 1-propanol was filtered with a polyflon filter (trade name: PF-040, produced by Advantec Toyo Kaisha, Ltd.).

In addition, the following materials were prepared.

| | |
|---|---|
| A hole-transportable compound represented by the following formula (U) | 90 parts |
| 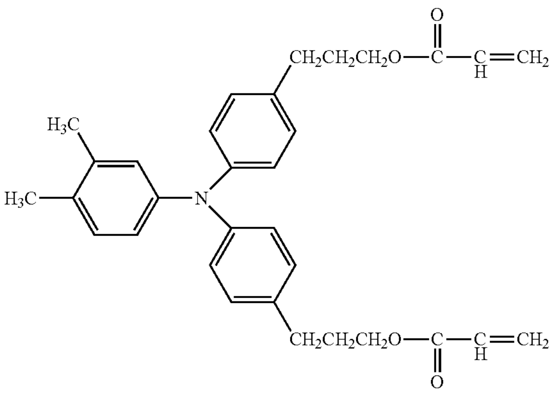 (U) | |
| 1,1,2,2,3,3,4-Heptafluorocyclopentane | 70 parts |
| 1-Propanol | 70 parts |

Those materials were added to the mixed solvent. The mixture was filtered with a polyflon filter (trade name: PF-020, produced by Advantec Toyo Kaisha, Ltd.) to prepare a coating liquid for a second charge transporting layer (protective layer). The coating liquid for a second charge transporting layer was applied onto the charge transporting layer by dip coating, and the resultant coat was dried in the atmosphere for 6 minutes at 50° C. After that, in nitrogen, the coat was irradiated with electron beams for 1.6 seconds under the conditions of an acceleration voltage of 70 kV and an absorbed dose of 8,000 Gy while the support (irradiation target body) was rotated at 200 rpm. Subsequently, the coat was heated by increasing its temperature from 25° C. to 125° C. in nitrogen over 30 seconds. The oxygen concentrations of the atmosphere at the time of the electron beam irradiation and at the time of the heating after the irradiation were each 15 ppm. Next, the coat was subjected to heating treatment in the atmosphere for 30 minutes at 100° C. to form a 5 μm thick second charge transporting layer (protective layer) cured by the electron beams.

Next, a linear groove was formed on the surface of the protective layer with a polishing sheet (trade name: GC3000, produced by Riken Corundum Co., Ltd.). The feeding speed of the polishing sheet was set to 40 mm/min, the number of revolutions of the product to be processed was set to 240 rpm, and the pressing pressure of the polishing sheet against the product to be processed was set to 7.5 $N/m^2$. The feeding direction of the polishing sheet and the rotation direction of the product to be processed were set to be the same direction. In addition, a backup roller having an outer diameter of 40 cm and an Asker C hardness of 40 was used. The linear groove was formed in the peripheral surface of the product to be processed under the foregoing conditions over 10 seconds.

Thus, Photosensitive Member 1 was produced.

(Production Example of Photosensitive Members 2 to 40)

Electrophotographic photosensitive members were produced in the same manner as the Production Example of photosensitive member 1, except that compounds of the formula (α), (β), (B1) and (B2) shown in Table 3-1 were used. The obtained electrophotographic photosensitive members are defined as photosensitive members 2 to 40.

(Production Example of Photosensitive Member 41)

Even an electroconductive layer was formed as in the Production Example of photosensitive member 1.

Next, 3.11 parts of an example compound of Table 1 (B154) as an electron transport material, 0.40 parts of a styrene-acrylic resin (Trade name: UC-3920, Toa Gosei) as a resin, 0.40 parts of a polyvinyl butyral resin (Trade name: BX-1, produced by Sekisui Chemical Co., Ltd.), and 6.49 parts of an isocyanate compound blocked (Trade name: SBB-70P, produced by Asahi Kasei) as an isocyanate compound were dissolved in a mixed solvent of 48 parts of 1-butanol and 24 parts of acetone. To this solution, 6 parts of tetrahydrofuran dissolved in 0.16 parts of an example compound (α 1) were added and stirred for 1 hour. The solution was then pressure-filtered using a polytetrafluoroethylene filter (trade name: PF020) produced by ADVANTEC. The resulting coating solution for the undercoat layer was applied to the electroconductive layer by immersion, and the resulting coating film was heated at 170 degrees C. for 40 minutes and cured (polymerized) to form an undercoat layer with a thickness of 1.0 μm on the electroconductive layer.

Thereafter, the electrophotographic photosensitive member was produced in the same manner as the Production example of the photosensitive member 1. The obtained photosensitive member is defined as the photosensitive member 41.

(Production Example of Photosensitive Members 42 to 48)

Electrophotographic photosensitive members were produced in the same manner as the Production Example of the photosensitive member 41, except that compounds of formula (α), (β), (B1) and (B2) shown in Table 3-1 were used. The obtained electrophotographic photosensitive members are defined as photosensitive members 42 to 48.

(Production Example of Photosensitive Members 49 to 69)

Electrophotographic photosensitive members were produced in the same manner as the Production example of photosensitive member 41, except that the film thickness of the undercoat layer and the amount of addition were changed as shown in Table 3-2, using compounds of formula (α), (β), (B1) and (B2) shown in Table 3-2. The obtained electrophotographic photosensitive members are defined as photosensitive members 49 to 69.

(Production Example of Photosensitive Member 70)

Aluminum cylinder (JIS-A3003, Aluminum alloy) with 370 mm in length and 30.5 mm in diameter was used as support (electroconductive support).

Next, 100 parts of zinc oxide particle (Specific surface area: 19 $m^2/g$, powder resistance: $3.6\times10^6$ Ω·cm) as a metal oxide was stirred and mixed with 500 parts of toluene, to which 0.8 parts of a silane coupling agent was added and stirred for 6 hours. The silane coupling agent used was N-2-(aminoethyl)-3 aminopropylmethyldimethoxysilane (Trade name: KBM602, produced by Shinetsu Chemical). The toluene was then distilled under reduced pressure and heat-dried at 130° C. for 6 hours to obtain surface-treated zinc oxide particle.

Next, the following materials were prepared.

| | |
|---|---|
| Butyral resin (Trade name: BM-1, produced by Sekisui Chemical Co., Ltd.) as polyol resin | 15 parts |
| Blocked isocyanate (Trade name: Sumidule 3175, produced by Sumika Bayer Urethane) | 15 parts |

These were dissolved in a mixed solution of 73.5 parts methyl ethyl ketone and 73.5 parts 1-butanol. To this solution 80.8 parts of the above surface-treated zinc oxide particle and 0.8 parts of 2,3,4-trihydroxybenzophenone (produced by Tokyo Chemical Industry Co., Ltd.) were added, which were dispersed in a Sand mill with 0.8 mm diameter glass beads in an atmosphere of 23±3° C. for 3 hours.

Next, the following materials were prepared.

| | |
|---|---|
| Silicone oil (Trade name: SH28 PA, produced by Toray Dow Corning Silicone) | 0.01 parts |
| Cross-linked polymethyl methacrylate (PMMA) particle (Trade name: TECHPOLYMER SSX-102, produced by Sekisui Chemical Co., Ltd., average primary particle diameter 2.5 μm) | 5.6 parts |

These were added to the above solution after dispersion and stirred to prepare a coating solution for the undercoat layer.

This coating solution for the undercoat layer was applied onto the above support by dip coating, and the resulting coating film was dried at 160° C. for 40 minutes to form an undercoat layer with a film thickness of 18 μm.

Thereafter, the electrophotographic photosensitive member was produced in the same manner as in the Production example of the photosensitive member 41, except that a compound represented by formula (α), a compound represented by formula (β), a compound represented by formula (B1) and a compound represented by formula (B2) were used as shown in Table 3-2. The obtained photosensitive member is defined as photosensitive member 70.

(Production Example of Photosensitive Members 71 to 86)

Electrophotographic photosensitive member were produced using a compound of formula (α), (β), (B1) and (B2) as shown in Table 3-2, in the same manner as the Production example of photosensitive member 70, except that the film thickness of the undercoat layer and the amount of addition were changed as shown in Table 3-2. The obtained electrophotographic photosensitive members are defined as photosensitive members 71 to 86.

(Production Example of Photosensitive Members 87 to 94)

Electrophotographic photosensitive members were produced using a compound of formula (α), (β), (B1) and (B2) as shown in Table 3-2, in the same manner as the Production example of photosensitive member 41, except that the film thickness of the undercoat layer and the amount of addition were changed as shown in Table 3-2. The obtained electrophotographic photosensitive members are defined as photosensitive members 87 to 94.

(Production Example of Photosensitive Member 95)

Aluminum cylinder (JIS-A3003, Aluminum alloy) with 370 mm in length and 30.5 mm in diameter was used as support (electroconductive support).

Next, 100 parts of aluminum oxide particle (Average primary particle diameter: 13 nm, specific surface area: 99 $m^2/g$) were stirred and mixed with 500 parts of toluene, and 0.22 parts of isobutyltrimethoxysilane (Trade name: Z-2306, produced by Toray Dow Corning) were added and stirred for 6 hours. The toluene was then distilled under reduced pressure and heated and dried at 140° C. for 6 hours to obtain surface-treated aluminum oxide particle.

Next, 15 parts of butyral (Trade name: BM-1, produced by Sekisui Chemical Co., Ltd.) and 15 parts of blocked isocyanate (Trade name: Sumidule 3175, produced by Sumika Covestro Urethane Co., Ltd. (formerly Sumitomo Bayer Urethane Co., Ltd.), nonvolatile: 75%, blocking agent: oxime-based) as polyols were dissolved in a mixture of 90 parts of methyl ethyl ketone and 90 parts of 1-butanol. To this solution, 54 parts of the above surface-treated aluminum particle oxide were added and dispersed in a Sand mill apparatus using 0.8 mm diameter glass beads for 3 hours in an atmosphere of 23±3° C.

After the dispersion treatment, 10 parts of silicone resin particle (Trade name: Tospearl 120, produced by Momentive Performance Materials, Average primary particle diameter: 2 μm, Density: 1.3 $g/cm^3$) and 0.01 parts of silicone oil (Trade name: SH28 PA, produced by Toray Dow Corning Corporation (formerly known as Toray Dow Corning Silicone Corporation)) were added and stirred to prepare the coating solution for the electroconductive layer. The resulting coating solution for the electroconductive layer was applied onto the above support by dip coating to form a coating film, and the coating film was dried at 160° C. for 30 minutes to form an electroconductive layer having a thickness of 18 μm.

On the formed electroconductive layer, an undercoat layer, a charge generating layer, a charge transporting layer, and a second charge transporting layer (protective layer) were formed, as in the Production example of the photosensitive member 1, except for the modifications shown in Table 3-2, and a linear groove was formed in the same manner on the peripheral surface of the surface to produce the electrophotographic photosensitive member. The obtained electrophotographic photosensitive member is defined as photosensitive member 95.

(Production Example of Photosensitive Member 96)

The electrophotographic photosensitive member was produced in the same manner as the Production example of photosensitive member 41, except that the film thickness of the undercoat layer and the amount of addition were changed as shown in Table 3-2, using a compound represented by formula (α) and two compounds represented by formula (β) shown in Table 3-2. The obtained electrophotographic photosensitive member is defined as photosensitive member 96.

TABLE 3-1

| | | Compound(α)(β) | | | Compound(B1)(B2) | | Thickness | Mass ratio | | | Potential | |
|---|---|---|---|---|---|---|---|---|---|---|---|---|
| Example | Photo-sensitive member | Compound | IPα, Ipβ [eV] | Additive amount (part) | Compound (B1) (B2) | Additive amount (part) | undercoat layer [μm] | α/B or β/B | Ipc [eV] | Ipu [eV] | fluctation value [V] | Residual potential [V] |
| 1 | 1 | α1 | 5.2 | 0.16 | B154 | 3.11 | 1 | 0.051 | 5.7 | 6.1 | 0.6 | 32 |
| 2 | 2 | α2 | 5.3 | 0.16 | B154 | 3.11 | 1 | 0.051 | 5.7 | 6.1 | 1 | 35 |
| 3 | 3 | α3 | 5.1 | 0.16 | B154 | 3.11 | 1 | 0.051 | 5.7 | 6.1 | 1 | 33 |
| 4 | 4 | α4 | 5.4 | 0.16 | B154 | 3.11 | 1 | 0.051 | 5.7 | 6.1 | 3.2 | 41 |
| 5 | 5 | α5 | 5.4 | 0.16 | B154 | 3.11 | 1 | 0.051 | 5.7 | 6.1 | 3.1 | 40 |
| 6 | 6 | α6 | 5.0 | 0.16 | B154 | 3.11 | 1 | 0.051 | 5.7 | 6.1 | 0.9 | 33 |
| 7 | 7 | β1 | 5.5 | 0.16 | B154 | 3.11 | 1 | 0.051 | 5.7 | 6.1 | 3.6 | 48 |
| 8 | 8 | β2 | 5.5 | 0.16 | B154 | 3.11 | 1 | 0.051 | 5.7 | 6.1 | 4 | 50 |
| 9 | 9 | α1 | 5.2 | 0.16 | B153 | 3.11 | 1 | 0.051 | 5.7 | 6.1 | 0.6 | 33 |
| 10 | 10 | α2 | 5.3 | 0.16 | B153 | 3.11 | 1 | 0.051 | 5.7 | 6.1 | 1 | 37 |
| 11 | 11 | α3 | 5.1 | 0.16 | B153 | 3.11 | 1 | 0.051 | 5.7 | 6.1 | 1 | 33 |
| 12 | 12 | α4 | 5.4 | 0.16 | B153 | 3.11 | 1 | 0.051 | 5.7 | 6.1 | 3.2 | 42 |
| 13 | 13 | α5 | 5.4 | 0.16 | B153 | 3.11 | 1 | 0.051 | 5.7 | 6.1 | 3 | 44 |
| 14 | 14 | α6 | 5.0 | 0.16 | B153 | 3.11 | 1 | 0.051 | 5.7 | 6.1 | 0.9 | 31 |
| 15 | 15 | β1 | 5.5 | 0.16 | B153 | 3.11 | 1 | 0.051 | 5.7 | 6.1 | 3.6 | 49 |
| 16 | 16 | β2 | 5.5 | 0.16 | B153 | 3.11 | 1 | 0.051 | 5.7 | 6.1 | 4 | 49 |
| 17 | 17 | α1 | 5.2 | 0.16 | B101 | 3.11 | 1 | 0.051 | 5.7 | 6.1 | 0.9 | 29 |
| 18 | 18 | α2 | 5.3 | 0.16 | B101 | 3.11 | 1 | 0.051 | 5.7 | 6.1 | 1 | 30 |
| 19 | 19 | α3 | 5.1 | 0.16 | B101 | 3.11 | 1 | 0.051 | 5.7 | 6.1 | 1 | 32 |
| 20 | 20 | α4 | 5.4 | 0.16 | B101 | 3.11 | 1 | 0.051 | 5.7 | 6.1 | 3.1 | 40 |
| 21 | 21 | α5 | 5.4 | 0.16 | B101 | 3.11 | 1 | 0.051 | 5.7 | 6.1 | 3.3 | 41 |
| 22 | 22 | α6 | 5.0 | 0.16 | B101 | 3.11 | 1 | 0.051 | 5.7 | 6.1 | 0.9 | 33 |
| 23 | 23 | β1 | 5.5 | 0.16 | B101 | 3.11 | 1 | 0.051 | 5.7 | 6.1 | 3.2 | 45 |
| 24 | 24 | β2 | 5.5 | 0.16 | B101 | 3.11 | 1 | 0.051 | 5.7 | 6.1 | 3.6 | 45 |

TABLE 3-1-continued

| | | Compound(α)(β) | | | Compound(B1)(B2) | | Thickness | Mass ratio | | | Potential | |
|---|---|---|---|---|---|---|---|---|---|---|---|---|
| Example | Photo-sensitive member | Compound | IPα, Ipβ [eV] | Additive amount (part) | Compound (B1) (B2) | Additive amount (part) | undercoat layer [μm] | α/B or β/B | Ipc [eV] | Ipu [eV] | fluctation value [V] | Residual potential [V] |
| 25 | 25 | α1 | 5.2 | 0.16 | B224 | 3.11 | 1 | 0.051 | 5.7 | 6.2 | 0.9 | 30 |
| 26 | 26 | α2 | 5.3 | 0.16 | B224 | 3.11 | 1 | 0.051 | 5.7 | 6.2 | 0.8 | 32 |
| 27 | 27 | α3 | 5.1 | 0.16 | B224 | 3.11 | 1 | 0.051 | 5.7 | 6.2 | 0.9 | 31 |
| 28 | 28 | α4 | 5.4 | 0.16 | B224 | 3.11 | 1 | 0.051 | 5.7 | 6.2 | 3.4 | 43 |
| 29 | 29 | α5 | 5.4 | 0.16 | B224 | 3.11 | 1 | 0.051 | 5.7 | 6.2 | 3.1 | 42 |
| 30 | 30 | α6 | 5.0 | 0.16 | B224 | 3.11 | 1 | 0.051 | 5.7 | 6.2 | 1 | 31 |
| 31 | 31 | β1 | 5.5 | 0.16 | B224 | 3.11 | 1 | 0.051 | 5.7 | 6.2 | 3.5 | 44 |
| 32 | 32 | β2 | 5.5 | 0.16 | B224 | 3.11 | 1 | 0.051 | 5.7 | 6.2 | 4 | 45 |
| 33 | 33 | α1 | 5.2 | 0.16 | B225 | 3.11 | 1 | 0.051 | 5.7 | 6.2 | 0.6 | 30 |
| 34 | 34 | α2 | 5.3 | 0.16 | B225 | 3.11 | 1 | 0.051 | 5.7 | 6.2 | 1 | 32 |
| 35 | 35 | α3 | 5.1 | 0.16 | B225 | 3.11 | 1 | 0.051 | 5.7 | 6.2 | 0.9 | 31 |
| 36 | 36 | α4 | 5.4 | 0.16 | B225 | 3.11 | 1 | 0.051 | 5.7 | 6.2 | 3.1 | 40 |
| 37 | 37 | α5 | 5.4 | 0.16 | B225 | 3.11 | 1 | 0.051 | 5.7 | 6.2 | 3.4 | 42 |
| 38 | 38 | α6 | 5.0 | 0.16 | B225 | 3.11 | 1 | 0.051 | 5.7 | 6.2 | 0.9 | 31 |
| 39 | 39 | β1 | 5.5 | 0.16 | B225 | 3.11 | 1 | 0.051 | 5.7 | 6.2 | 3.5 | 44 |
| 40 | 40 | β2 | 5.5 | 0.16 | B225 | 3.11 | 1 | 0.051 | 5.7 | 6.2 | 3.8 | 45 |
| 41 | 41 | α1 | 5.2 | 0.16 | B154 | 3.11 | 1 | 0.051 | 5.7 | 6.2 | 0.6 | 30 |
| 42 | 42 | α2 | 5.3 | 0.16 | B154 | 3.11 | 1 | 0.051 | 5.7 | 6.2 | 0.8 | 32 |
| 43 | 43 | α3 | 5.1 | 0.16 | B154 | 3.11 | 1 | 0.051 | 5.7 | 6.2 | 0.8 | 31 |
| 44 | 44 | α4 | 5.4 | 0.16 | B154 | 3.11 | 1 | 0.051 | 5.7 | 6.2 | 3 | 40 |
| 45 | 45 | α5 | 5.4 | 0.16 | B154 | 3.11 | 1 | 0.051 | 5.7 | 6.2 | 3 | 42 |
| 46 | 46 | α6 | 5.0 | 0.16 | B154 | 3.11 | 1 | 0.051 | 5.7 | 6.2 | 0.9 | 31 |
| 47 | 47 | β1 | 5.5 | 0.16 | B154 | 3.11 | 1 | 0.051 | 5.7 | 6.2 | 3.3 | 44 |
| 48 | 48 | β2 | 5.5 | 0.16 | B154 | 3.11 | 1 | 0.051 | 5.7 | 6.2 | 3.9 | 45 |

TABLE 3-2

| | | Compound(α)(β) | | | Compound(B1)(B2) | | Thickness | Mass ratio | | | Potential | |
|---|---|---|---|---|---|---|---|---|---|---|---|---|
| Example | Photo-sensitive member | Compound | IPα, Ipβ [eV] | Additive amount (part) | Compound (B1) (B2) | Additive amount (part) | undercoat layer [μm] | α/B or β/B | Ipc [eV] | Ipu [eV] | fluctation value [V] | Residual potential [V] |
| 49 | 49 | α1 | 5.2 | 0.11 | B154 | 3.11 | 1 | 0.035 | 5.7 | 6.1 | 1 | 33 |
| 50 | 50 | α1 | 5.2 | 0.3 | B154 | 3.11 | 1 | 0.096 | 5.7 | 6 | 0.6 | 30 |
| 51 | 51 | α1 | 5.2 | 0.16 | B154 | 3.11 | 2.4 | 0.051 | 5.7 | 6.1 | 1 | 35 |
| 52 | 52 | α5 | 5.4 | 0.16 | B154 | 3.11 | 2.4 | 0.051 | 5.7 | 6.1 | 3.4 | 50 |
| 53 | 53 | α1 | 5.2 | 0.25 | B154 | 3.11 | 1.8 | 0.080 | 5.7 | 6.1 | 0.6 | 32 |
| 54 | 54 | α2 | 5.3 | 0.25 | B154 | 3.11 | 1.8 | 0.080 | 5.7 | 6.1 | 0.9 | 35 |
| 55 | 55 | α3 | 5.1 | 0.25 | B154 | 3.11 | 1.8 | 0.080 | 5.7 | 6.1 | 0.8 | 33 |
| 56 | 56 | α4 | 5.4 | 0.25 | B154 | 3.11 | 1.8 | 0.080 | 5.7 | 6.1 | 3.1 | 40 |
| 57 | 57 | α5 | 5.4 | 0.25 | B154 | 3.11 | 1.8 | 0.080 | 5.7 | 6.1 | 3.1 | 40 |
| 58 | 58 | α6 | 5.0 | 0.25 | B154 | 3.11 | 1.8 | 0.080 | 5.7 | 6.1 | 0.6 | 33 |
| 59 | 59 | β1 | 5.5 | 0.25 | B154 | 3.11 | 1.8 | 0.080 | 5.7 | 6.1 | 3.3 | 44 |
| 60 | 60 | β2 | 5.5 | 0.25 | B154 | 3.11 | 1.8 | 0.080 | 5.7 | 6.1 | 3.9 | 45 |
| 61 | 61 | α1 | 5.2 | 0.11 | B154 | 3.11 | 1.8 | 0.035 | 5.7 | 6.1 | 0.7 | 33 |
| 62 | 62 | α2 | 5.3 | 0.11 | B154 | 3.11 | 1.8 | 0.035 | 5.7 | 6.1 | 0.8 | 35 |
| 63 | 63 | α3 | 5.1 | 0.11 | B154 | 3.11 | 1.8 | 0.035 | 5.7 | 6.1 | 0.8 | 31 |
| 64 | 64 | α4 | 5.4 | 0.11 | B154 | 3.11 | 1.8 | 0.035 | 5.7 | 6.1 | 3.2 | 41 |
| 65 | 65 | α5 | 5.4 | 0.11 | B154 | 3.11 | 1.8 | 0.035 | 5.7 | 6.1 | 3.1 | 42 |
| 66 | 66 | α6 | 5.0 | 0.11 | B154 | 3.11 | 1.8 | 0.035 | 5.7 | 6.1 | 0.6 | 32 |
| 67 | 67 | α1 | 5.2 | 0.16 | B154 | 3.11 | 0.2 | 0.051 | 5.7 | 6.1 | 1 | 35 |
| 68 | 68 | α5 | 5.4 | 0.16 | B154 | 3.11 | 0.2 | 0.051 | 5.7 | 6.1 | 3.5 | 49 |
| 69 | 69 | α3 | 5.1 | 0.25 | B154 | 3.11 | 0.2 | 0.080 | 5.7 | 6.1 | 1 | 33 |
| 70 | 70 | α1 | 5.2 | 0.25 | B154 | 3.11 | 1.8 | 0.080 | 5.8 | 6.1 | 0.6 | 32 |
| 71 | 71 | α2 | 5.3 | 0.25 | B154 | 3.11 | 1.8 | 0.080 | 5.8 | 6.1 | 0.9 | 34 |
| 72 | 72 | α3 | 5.1 | 0.25 | B154 | 3.11 | 1.8 | 0.080 | 5.8 | 6.1 | 0.8 | 33 |
| 73 | 73 | α4 | 5.4 | 0.25 | B154 | 3.11 | 1.8 | 0.080 | 5.8 | 6.1 | 1.2 | 38 |
| 74 | 74 | α5 | 5.4 | 0.25 | B154 | 3.11 | 1.8 | 0.080 | 5.8 | 6.1 | 1.2 | 38 |
| 75 | 75 | α6 | 5.0 | 0.25 | B154 | 3.11 | 1.8 | 0.080 | 5.8 | 6.1 | 0.6 | 31 |
| 76 | 76 | β1 | 5.5 | 0.25 | B154 | 3.11 | 1.8 | 0.080 | 5.8 | 6.1 | 3.3 | 42 |
| 77 | 77 | β2 | 5.5 | 0.25 | B154 | 3.11 | 1.8 | 0.080 | 5.8 | 6.1 | 3.1 | 40 |
| 78 | 78 | α1 | 5.2 | 0.3 | B154 | 3.11 | 1.8 | 0.096 | 5.8 | 6 | 0.7 | 30 |
| 79 | 79 | α1 | 5.2 | 0.25 | B225 | 3.11 | 1.8 | 0.080 | 5.8 | 6.2 | 0.7 | 30 |
| 80 | 80 | α2 | 5.3 | 0.25 | B225 | 3.11 | 1.8 | 0.080 | 5.8 | 6.2 | 0.9 | 32 |
| 81 | 81 | α3 | 5.1 | 0.25 | B225 | 3.11 | 1.8 | 0.080 | 5.8 | 6.2 | 0.8 | 31 |
| 82 | 82 | α4 | 5.4 | 0.25 | B225 | 3.11 | 1.8 | 0.080 | 5.8 | 6.2 | 1.1 | 38 |
| 83 | 83 | α5 | 5.4 | 0.25 | B225 | 3.11 | 1.8 | 0.080 | 5.8 | 6.2 | 1.1 | 38 |
| 84 | 84 | α6 | 5.0 | 0.25 | B225 | 3.11 | 1.8 | 0.080 | 5.8 | 6.2 | 0.9 | 33 |
| 85 | 85 | β1 | 5.5 | 0.25 | B225 | 3.11 | 1.8 | 0.080 | 5.8 | 6.2 | 3.5 | 45 |
| 86 | 86 | β2 | 5.5 | 0.25 | B225 | 3.11 | 1.8 | 0.080 | 5.8 | 6.2 | 3.4 | 42 |

TABLE 3-2-continued

| Example | Photo-sensitive member | Compound(α)(β) Compound | IPα, Ipβ [eV] | Additive amount (part) | Compound(B1)(B2) Compound (B1) (B2) | Additive amount (part) | Thickness undercoat layer [μm] | Mass ratio α/B or β/B | Ipc [eV] | Ipu [eV] | Potential fluctation value [V] | Residual potential [V] |
|---|---|---|---|---|---|---|---|---|---|---|---|---|
| 87 | 87 | α7 | 5.9 | 0.16 | B154 | 3.11 | 1 | 0.051 | 5.7 | 6.1 | 6.5 | 63 |
| 88 | 88 | α8 | 5.7 | 0.16 | B154 | 3.11 | 1 | 0.051 | 5.7 | 6.1 | 6.3 | 61 |
| 89 | 89 | α9 | 5.8 | 0.16 | B154 | 3.11 | 1 | 0.051 | 5.7 | 6.1 | 6.8 | 60 |
| 90 | 90 | β3 | 5.8 | 0.16 | B154 | 3.11 | 1 | 0.051 | 5.7 | 6.1 | 6.8 | 62 |
| 91 | 91 | β4 | 5.9 | 0.16 | B154 | 3.11 | 1 | 0.051 | 5.7 | 6.1 | 7 | 63 |
| 92 | 92 | α10 | 6.0 | 0.16 | B154 | 3.11 | 1 | 0.051 | 5.7 | 6.1 | 7.1 | 62 |
| 93 | 93 | β5 | 6.1 | 0.16 | B225 | 3.11 | 1 | 0.051 | 5.7 | 6.2 | 6.9 | 62 |
| 94 | 94 | α11 | 6.1 | 0.16 | B225 | 3.11 | 1 | 0.051 | 5.7 | 6.2 | 7.1 | 63 |
| 95 | 95 | α6 | 5.0 | 0.16 | B154 | 3.11 | 1 | 0.051 | 5.4 | 6.1 | 0.8 | 32 |
| 96 | 96 | α2 | 5.3 | 0.25 | B154/B225 | 2.11/1.00 | 1.8 | 0.08 | 5.7 | 6.3 | 0.7 | 31 |

(Production Example of Photosensitive Member 101)

The electrophotographic photosensitive member was produced in the same manner as the Production example of photosensitive member 1, except that the compound (α 1) was not added to the coating solution for the undercoat layer as shown in Table 4. The obtained electrophotographic photosensitive member is defined as photosensitive member 101.

(Production Example of Photosensitive Member 102)

Aluminum cylinder (JIS-A3003, Aluminum alloy) with 370 mm in length and 30.5 mm in diameter was used as support (electroconductive support). Then, 19.5 parts of blocked isocyanate (Sumidule BL3175, produced by Sumika Bayer Urethane Co., 75 mass % solid) and 7.5 parts of butyral resin (S-LEC BL-1, produced by Sekisui Chemical) were dissolved in 130 parts of methyl ethyl ketone. Next, 34 parts of pigment orange 43 (produced by Tokyo Chemical Industry Co., Ltd.) and 0.9 parts of compound (α 7) were mixed into the above solution, and dispersed in a Sand mill for 10 hours to obtain a dispersion. To this dispersion, 0.005 parts of bismuth carboxylate (K-KATXK-640, produced by King Industry) and 2 parts of silicone resin particle (Tospearl 145, produced by Momentive Performance Materials) were added to obtain a coating solution for the undercoat layer. This coating solution for the undercoat layer was dip coated on the electroconductive layer and cured at 160° C. for 60 minutes to form an undercoat layer 7 microns thick. All layers above the undercoat layer were fabricated in the same manner as in the Production example of photosensitive member 1. The obtained electrophotographic photosensitive member is defined as photosensitive member 102.

(Production Example of Photosensitive Member 103)

Aluminum cylinder (JIS-A3003, Aluminum alloy) with 370 mm in length and 30.5 mm in diameter was used as support (electroconductive support). Next, 19.5 parts of blocked isocyanate (Sumidule BL3175, produced by Sumika Bayer Urethane Co., 75 mass % solid) and 7.5 parts of butyral resin (S-LEC BL-1, produced by Sekisui Chemical) were dissolved in 130 parts of methyl ethyl ketone. Next, 34 parts of pigment orange 43 (produced by Tokyo Chemical Industry Co., Ltd.) and 3 parts of compound (a 8) were mixed into the above solution, and dispersed in a Sand mill for 10 hours to obtain a dispersion. To this dispersion, 0.005 parts of bismuth carboxylate (K-KATXK-640, produced by King Industry) and 2 parts of silicone resin particle (Tospearl 145, produced by Momentive Performance Materials) were added to obtain a coating solution for the undercoat layer. This coating solution for the undercoat layer was applied onto the electroconductive layer by dip coating and cured at 160° C. for 60 minutes to form an undercoat layer 7 microns thick. All layers above the undercoat layer were fabricated in the same manner as in the Production example of photosensitive member 1. The obtained electrophotographic photosensitive member is defined as photosensitive member 103.

(Production Example of Photosensitive Member 104)

The electrophotographic photosensitive member was produced in the same manner as in the Production example of photosensitive member 1, except that the compound (α 8) used in the Production example of photosensitive member 103 was changed to (α 101) as shown in the following formula. The obtained electrophotographic photosensitive member is defined as photosensitive member 104.

(α 101)

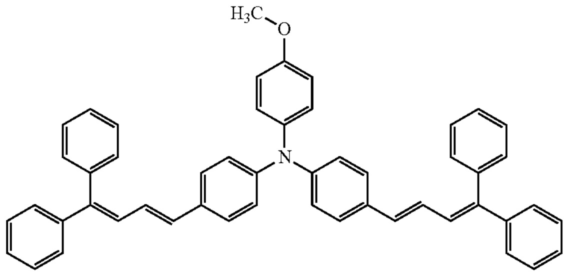

TABLE 4

| Comparative Example | Photo-sensitive member | Compound(α)(β) Compound | Ipα, Ipβ [eV] | Additive amount [part] | Compound(B1)(B2) Compound (B1) (B2) | Additive amount [part] | Thickness undercoat layer [μm] | Mass ratio α/B or β/B | Ipc [eV] | Ipu [eV] | Potential fluctation value [V] | Residual potential [V] |
|---|---|---|---|---|---|---|---|---|---|---|---|---|
| 1 | 101 | — | — | — | B154 | 3.11 | 1 | — | 5.7 | 6.1 | 9 | 68 |
| 2 | 102 | α7 | 5.8 | 0.9 | Pigment orange43 | 34 | 7 | 0.026 | — | 6.0 | 9.8 | 79 |

TABLE 4-continued

| | | Compound(α)(β) | | | Compound(B1)(B2) | | Thickness | Mass ratio | | | Potential | |
|---|---|---|---|---|---|---|---|---|---|---|---|---|
| Comparative Example | Photo-sensitive member | Compound | Ipα, Ipβ [eV] | Additive amount [part] | Compound (B1) (B2) | Additive amount [part] | undercoat layer [μm] | α/B or β/B | Ipc [eV] | Ipu [eV] | fluctation value [V] | Residual potential [V] |
| 3 | 103 | α8 | 5.7 | 3 | Pigment orange43 | 34 | 7 | 0.088 | — | 6.0 | 9.9 | 81 |
| 4 | 104 | α101 | 5.6 | 3 | Pigment orange43 | 34 | 7 | 0.088 | — | 6.0 | 9.8 | 81 |

Evaluation

Examples 1 to 96 and Comparative Examples 1 to 4

A photosensitive member 1 was prepared and attached to a cyan station of an electrophotographic apparatus (coping machine) (Trade name: imagePRESSC910, produced by Canon Inc.), which is an evaluation apparatus, and the evaluation was carried out as follows.

To measure the surface potential of the electrophotographic photosensitive member, a developing cartridge was removed from the evaluation apparatus, a potential probe (Trade name: model 6000B-8, produced by Trek) was set in the evaluation apparatus, and a surface electrometer (Trade name: model 1344, produced by Trek) was used.

First, the dark potential (Vd) of the electrophotographic photosensitive member used for evaluation was adjusted to be −700 V under a 30° C./80% RH environment. Next, the exposure light quantity of the exposure apparatus was adjusted so that the light potential (Vl) of the electrophotographic photosensitive member was adjusted to be −200 V.

The light potential was measured at the axial center position of the electrophotographic photosensitive member and at 40 mm from both ends of the electrophotographic photosensitive member at 12 points every 30° in the circumferential direction (total: 3 points in the axial direction× 12 points in the circumferential direction=36 points). Then, the average value during 1 circumference of the electrophotographic photosensitive member was calculated at each axial position to obtain the light potential. Then, the developing cartridge was returned to its original position, and 20 sheets of paper were passed through the cartridge in a 30° C./80% RH environment. Then, the potential probe was set again, and the average value in 1 circumference of the electrophotographic photosensitive member was calculated for each axial position as above, and this was used as the potential after passing 20 sheets of paper in each axial position. Finally, the absolute value of (initial potential−potential after passing 20 sheets of paper) was calculated in each axial direction, and the value was calculated as the short-term potential fluctuation value. The evaluation results are shown in Tables 3-1, 3-2, and 4.

The measurement of the residual potential was started when the electrophotographic photosensitive member made one lap from the position where the charge had broken after the measurement of the light potential after passing 20 sheets of paper, and then the measurement was made for one lap of the electrophotographic photosensitive member. The measurement of the residual potential was also carried out at 12 points in every 30° circumferential direction in the same way as the measurement of the light potential. Then, the average value during 1 circumference of the electrophotographic photosensitive member was calculated and this was defined as the residual potential.

The obtained evaluation results are shown in Tables 3-1, 3-2 and 4.

Ionization potential of the undercoat layer was measured using AC-3 (produced by Riken Keiki Co., Ltd.). Measurements were made from the surface of the formed undercoat layer at a step of 0.05 eV with a start energy of 4.00 eV and an end energy of 7.00 eV. The evaluation results are shown in Tables 3-1, 3-2 and 4.

The above photosensitive member 1 was changed to photosensitive members 2 to 96 and photosensitive members 101 to 104, and the residual potential and the ionization potential of the undercoat layer were similarly obtained. The obtained evaluation results are shown in Tables 3-1, 3-2, and 4.

According to the present disclosure, an electrophotographic photosensitive member with low residual potential and small potential fluctuation can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-132908, filed Aug. 24, 2022, Japanese Patent Application No. 2023-066553, filed Apr. 14, 2023 and Japanese Patent Application No. 2023-105401, filed Jun. 27, 2023 which are hereby incorporated by reference herein in their entirety.

What is claimed is:

1. An electrophotographic photosensitive member comprising a support, an electroconductive layer, an undercoat layer, a charge generating layer, and a hole transporting layer, in this order, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer comprises an electron transporting compound and a compound (α), and when an ionization potential of the compound (α) is defined as IPα, the IPc, the IPu and the IPα satisfy relation (1):

$$IPu-IPc>IP\alpha-IPc \qquad (1)$$

wherein the compound (α) is a compound represented by formula (α):

(α)

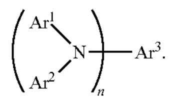

in formula (α), $Ar^1$ and $Ar^2$ each independently denote a substituted or unsubstituted phenyl group, $Ar^3$ denotes an n-valent aromatic group, and n is an integer of 1 to 3, and wherein the undercoat layer comprises a cured product of a composition comprising a compound represented by formula (B1) or (B2):

(B1)

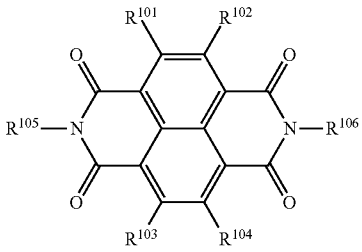

(B2)

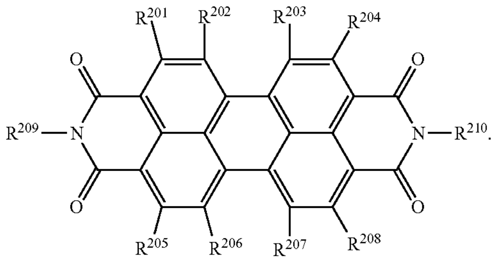

in formulae (B1) and (B2), $R^{101}$ to $R^{106}$ and $R^{201}$ to $R^{210}$ each independently denote a monovalent group represented by formula (C), a hydrogen atom, a cyano group, a nitro group, a halogen atom, an alkoxycarbonyl group, a substituted or unsubstituted alkyl group, a substituted or unsubstituted aryl group, or a substituted or unsubstituted heterocyclic group, provided that, at least one of $R^{101}$ to $R^{106}$ and at least one of $R^{201}$ to $R^{210}$ are monovalent groups represented by formula (C), one of the $CH_2$s of the alkyl group may be substituted with O or S, or one of the CHs of the alkyl group may be substituted with N, a substituent of the substituted alkyl group is at least one group selected from a group consisting of an aryl group, an alkoxycarbonyl group, a halogen atom, and a hydroxy group, a substituent of the substituted aryl group and a substituent of the substituted heterocyclic group are at least one group selected from a group consisting of a halogen atom, a nitro group, a cyano group, an alkyl group, an alkyl group substituted with a halogen group, and an alkoxy group:

$$-(a)_l-(b)_m-c \quad (C)$$

in formula (C), at least one of a, b, and c comprises at least one group selected from a group consisting of a hydroxy group, a thiol group, an amino group, and a carboxy group, l and m are each independently 0 or 1, and the sum of l and m is 0 to 2;

a denotes an alkylene group having 1 to 6 carbon atoms in a main chain, an alkylene group having 1 to 6 carbon atoms in the main chain substituted with an alkyl group having 1 to 6 carbon atoms, an alkylene group having 1 to 6 carbon atoms in the main chain substituted with a benzyl group, an alkylene group having 1 to 6 carbon atoms in the main chain substituted with an alkoxycarbonyl group, or an alkylene group having 1 to 6 carbon atoms in the main chain substituted with a phenyl group, and these alkylene groups may comprise at least one group selected from a group consisting of a hydroxy group, a thiol group, an amino group, and a carboxy group as a substituent, one of the $CH_2$s in the main chain of these alkylene groups may be substituted with O or S, or one of the CHs in the main chain of these alkylene groups may be substituted with N;

b denotes a phenylene group, a phenylene group substituted with an alkyl group having 1 to 6 carbon atoms, a phenylene group substituted with a nitro group, a phenylene group substituted with a halogen group, or a phenylene group substituted with an alkoxy group, and these phenylene groups may comprise at least one group selected from a group consisting of a hydroxy group, a thiol group, an amino group, and a carboxy group as a substituent;

c denotes a hydrogen atom, a carboxy group, an alkyl group having 1 to 6 carbon atoms in the main chain, or an alkyl group having 1 to 6 carbon atoms in the main chain substituted with an alkyl group having 1 to 5 carbon atoms, and these alkyl groups may comprise at least one group selected from a group consisting of a hydroxy group, a thiol group, an amino group, and a carboxy group as a substituent.

2. The electrophotographic photosensitive member according to claim 1, wherein the IPc and the IPα satisfy relation (3):

$$IP\alpha \leq IPc - 0.2 \text{ eV} \quad (3).$$

3. The electrophotographic photosensitive member according to claim 2, wherein the IPc and the IPα satisfy relation (4):

$$IP\alpha < IPc - 0.3 \text{ eV} \quad (4).$$

4. The electrophotographic photosensitive member according to claim 1, wherein the IPc and the IPα satisfy relation (5):

$$IP\alpha \geq IPc - 0.8 \text{ eV} \quad (5).$$

5. The electrophotographic photosensitive member according to claim 1, wherein the content of the compound (α) is 3.5 to 10 mass % with respect to the compound represented by formula (B1) or (B2).

6. The electrophotographic photosensitive member according to claim 1, wherein the IPα is 5.0 to 5.5 eV.

7. An electrophotographic photosensitive member comprising a support, an electroconductive layer, an undercoat layer, a charge generating layer, and a hole transporting layer, in this order, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer is formed by copolymerization of a compound (β) with an electron transporting compound, and when an ionization potential of the compound (β) is defined as IPβ, the IPc, the IPu and the IPβ satisfy relation (2):

$$IPu-IPc>IP\beta-IPc \quad (2)$$

wherein the compound (β) is a compound represented by formula (β):

(β)

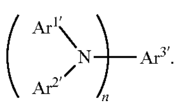

in formula (3), $Ar^{1'}$ and $Ar^{2'}$ each independently denote a substituted or unsubstituted phenyl group, provided that, at least one of $Ar^{1'}$ and $Ar^{2'}$ is a phenyl group substituted with a polymerizable functional group, $Ar^{3'}$ denotes an n-valent aromatic group, and n is an integer of 1 to 3, and wherein the undercoat layer comprises a cured product of a composition containing a compound represented by formula (B1) or (B2):

(B1)

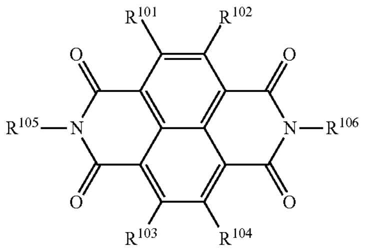

(B2)

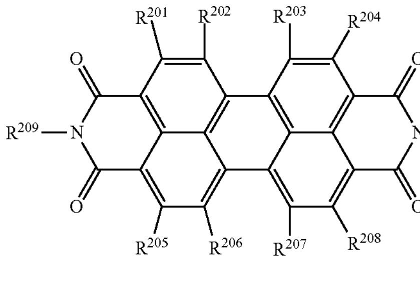

in formulae (B1) and (B2), $R^{101}$ to $R^{106}$ and $R^{201}$ to $R^{210}$ each independently denote a monovalent group represented by formula (C), a hydrogen atom, a cyano group, a nitro group, a halogen atom, an alkoxycarbonyl group, a substituted or unsubstituted alkyl group, a substituted or unsubstituted aryl group, or a substituted or unsubstituted heterocyclic group, provided that at least one of $R^{101}$ to $R^{106}$ and at least one of $R^{201}$ to $R^{210}$ are monovalent groups represented by formula (C), one of the $CH_2$s of the alkyl group may be substituted with O or S, or one of the CHs of the alkyl group may be substituted with N, a substituent of the substituted alkyl group is at least one group selected from a group consisting of an aryl group, an alkoxycarbonyl group, a halogen atom, and a hydroxy group, a substituent of the substituted aryl group and a substituent of the substituted heterocyclic group are at least one group selected from a group consisting of a halogen atom, a nitro group, a cyano group, an alkyl group, an alkyl group substituted with a halogen group, and an alkoxy group:

$$-(a)_l-(b)_m-c \quad (C)$$

in formula (C), at least one of a, b, and c comprise at least one group selected from a group consisting of a hydroxy group, a thiol group, an amino group, and a carboxy group, l and m are ach independently 0 or 1, and the sum of l and m is 0 to 2;

a denotes an alkylene group having 1 to 6 carbon atoms in a main chain, an alkylene group having 1 to 6 carbon atoms in the main chain substituted with an alkyl group having 1 to 6 carbon atoms, an alkylene group having 1 to 6 carbon atoms in the main chain substituted with a benzyl group, an alkylene group having 1 to 6 carbon atoms in the main chain substituted with an alkoxycarbonyl group, or an alkylene group having 1 to 6 carbon atoms in the main chain substituted with a phenyl group, and these alkylene groups may comprise at least one group selected from a group consisting of a hydroxy group, a thiol group, an amino group, and a carboxy group as a substituent, one of the $CH_2$s in the main chain of these alkylene groups may be substituted with O or S, or one of the CHs in the main chain of these alkylene groups may be substituted with N;

b denotes a phenylene group, a phenylene group substituted with an alkyl group having 1 to 6 carbon atoms, a phenylene group substituted with a nitro group, a phenylene group substituted with a halogen group, or a phenylene group substituted with an alkoxy group, and these phenylene groups may comprise at least one group selected from a group consisting of a hydroxy group, a thiol group, an amino group, and a carboxy group as a substituent;

c denotes a hydrogen atom, a carboxy group, an alkyl group having 1 to 6 carbon atoms in the main chain, or an alkyl group having 1 to 6 carbon atoms in the main chain substituted with an alkyl group having 1 to 5 carbon atoms, and these alkyl groups may comprise at least one group selected from a group consisting of a hydroxy group, a thiol group, an amino group, and a carboxy group as a substituent.

8. The electrophotographic photosensitive member according to claim 7, wherein the IPc and the IPβ satisfy relation (6):

$$IP\beta \leq IPc-0.2 \text{ eV} \quad (6).$$

9. The electrophotographic photosensitive member according to claim 8, wherein the IPc and the IPβ satisfy relation (7):

$$IP\beta<IPc-0.3 \text{ eV} \quad (7).$$

10. The electrophotographic photosensitive member according to claim 7, wherein the IPc and the IPβ satisfy relation (8):

$$IP\beta \geq IPc-0.8 \text{ eV} \quad (8).$$

11. The electrophotographic photosensitive member according to claim 7, wherein the content of the compound (β) is 3.5 to 10 mass % with respect to the compound represented by formula (B1) or (B2).

12. The electrophotographic photosensitive member according to claim 7, wherein the IPβ is 5.0 to 5.5 eV.

13. A process cartridge integrally supports an electrophotographic photosensitive member comprising a support, an electroconductive layer, an undercoat layer, a charge generating layer, and a hole transporting layer, in this order, and at least one unit selected from a group consisting of a charging unit, a developing unit and a cleaning unit, and is detachable from a main body of an electrophotographic apparatus, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer comprises an electron transporting compound and a compound (α), and when an ionization potential of the compound (α) is defined as IPα, the IPc, the IPu and the IPα satisfy relation (1):

$$IPu-IPc>IP\alpha-IPc \quad (1)$$

wherein the compound (α) is a compound represented by formula (α):

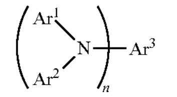

in formula (α), $Ar^1$ and $Ar^2$ each independently denote a substituted or unsubstituted phenyl group, $Ar^3$ denotes an n-valent aromatic group, and n is an integer of 1 to 3, and wherein the undercoat layer comprises a cured product of a composition comprising a compound represented by formula (B1) or (B2):

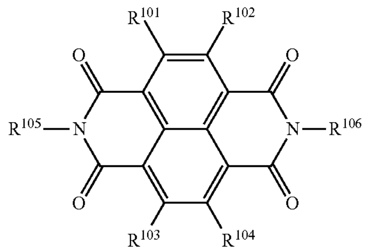

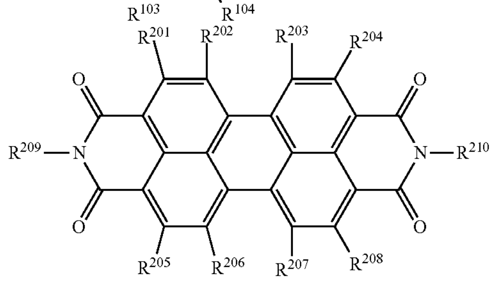

in formulae (B1) and (B2), $R^{101}$ to $R^{106}$ and $R^{201}$ to $R^{210}$ each independently denote a monovalent group represented by formula (C), a hydrogen atom, a cyano group, a nitro group, a halogen atom, an alkoxycarbonyl group, a substituted or unsubstituted alkyl group, a substituted or unsubstituted aryl group, or a substituted or unsubstituted heterocyclic group, provided that, at least one of $R^{101}$ to $R^{106}$ and at least one of $R^{201}$ to $R^{210}$ are monovalent groups represented by formula (C), one of the $CH_2$s of the alkyl group may be substituted with O or S, or one of the CHs of the alkyl group may be substituted with N, a substituent of the substituted alkyl group is at least one group selected from a group consisting of an aryl group, an alkoxycarbonyl group, a halogen atom, and a hydroxy group, a substituent of the substituted aryl group and a substituent of the substituted heterocyclic group are at least one group selected from a group consisting of a halogen atom, a nitro group, a cyano group, an alkyl group, an alkyl group substituted with a halogen group, and an alkoxy group:

$$-(a)_l-(b)_m-c$$

in formula (C), at least one of a, b, and c comprises at least one group selected from a group consisting of a hydroxy group, a thiol group, an amino group, and a carboxy group, l and m are each independently 0 or 1, and the sum of l and m is 0 to 2;

a denotes an alkylene group having 1 to 6 carbon atoms in a main chain, an alkylene group having 1 to 6 carbon atoms in the main chain substituted with an alkyl group having 1 to 6 carbon atoms, an alkylene group having 1 to 6 carbon atoms in the main chain substituted with a benzyl group, an alkylene group having 1 to 6 carbon atoms in the main chain substituted with an alkoxycarbonyl group, or an alkylene group having 1 to 6 carbon atoms in the main chain substituted with a phenyl group, and these alkylene groups may comprise at least one group selected from a group consisting of a hydroxy group, a thiol group, an amino group, and a carboxy group as a substituent, one of the $CH_2$s in the main chain of these alkylene groups may be substituted with O or S, or one of the CHs in the main chain of these alkylene groups may be substituted with N;

b denotes a phenylene group, a phenylene group substituted with an alkyl group having 1 to 6 carbon atoms, a phenylene group substituted with a nitro group, a phenylene group substituted with a halogen group, or a phenylene group substituted with an alkoxy group, and these phenylene groups may comprise at least one group selected from a group consisting of a hydroxy group, a thiol group, an amino group, and a carboxy group as a substituent;

c denotes a hydrogen atom, a carboxy group, an alkyl group having 1 to 6 carbon atoms in the main chain, or an alkyl group having 1 to 6 carbon atoms in the main chain substituted with an alkyl group having 1 to 5 carbon atoms, and these alkyl groups may comprise at least one group selected from a group consisting of a hydroxy group, a thiol group, an amino group, and a carboxy group as a substituent.

14. A process cartridge integrally supports an electrophotographic photosensitive member comprising a support, an electroconductive layer, an undercoat layer, a charge generating layer, and a hole transporting layer, in this order, and at least one unit selected from a group consisting of a charging unit, a developing unit and a cleaning unit, and is detachable from a main body of an electrophotographic apparatus, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer is formed by copolymerization of a compound (β) with an electron transporting compound, and when an ionization potential of the compound (β) is defined as IPβ, the IPc, the IPu and the IPβ satisfy relation (2):

$$IPu-IPc>IP\beta-IPc \quad (2)$$

wherein the compound (β) is a compound represented by formula (β);

(β)

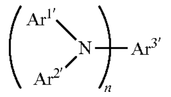

in formula (β), $Ar^{1'}$ and $Ar^{2'}$ each independently denote a substituted or unsubstituted phenyl group, provided that, at least one of $Ar^{1'}$ and $Ar^{2'}$ is a phenyl group substituted with a polymerizable functional group, $Ar^{3'}$ denotes an n-valent aromatic group, and n is an integer of 1 to 3, and wherein the undercoat layer comprises a cured product of a composition containing a compound represented by formula (B1) or (B2):

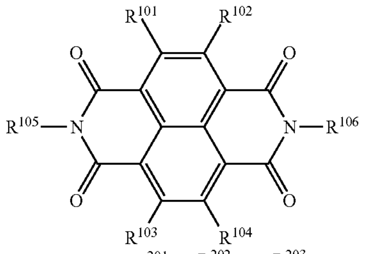

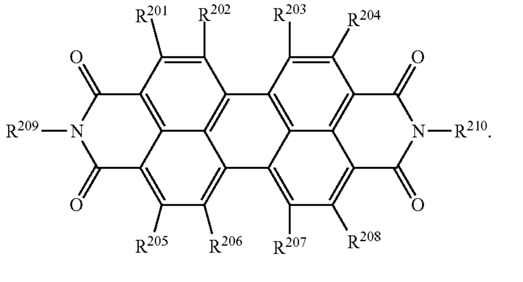

in formulae (B1) and (B2), $R^{101}$ to $R^{106}$ and $R^{201}$ to $R^{210}$ each independently denote a monovalent group represented by formula (C), a hydrogen atom, a cyano group, a nitro group, a halogen atom, an alkoxycarbonyl group, a substituted or unsubstituted alkyl group, a substituted or unsubstituted aryl group, or a substituted or unsubstituted heterocyclic group, provided that at least one of $R^{101}$ to $R^{106}$ and at least one of $R^{201}$ to $R^{210}$ are monovalent groups represented by formula (C), one of the $CH_2$s of the alkyl group may be substituted with O or S, or one of the CHs of the alkyl group may be substituted with N, a substituent of the substituted alkyl group is at least one group selected from a group consisting of an aryl group, an alkoxycarbonyl group, a halogen atom, and a hydroxy group, a substituent of the substituted aryl group and a substituent of the substituted heterocyclic group are at least one group selected from a group consisting of a halogen atom, a nitro group, a cyano group, an alkyl group, an alkyl group substituted with a halogen group, and an alkoxy group:

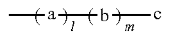

in formula (C), at least one of a, b, and c comprise at least one group selected from a group consisting of a hydroxy group, a thiol group, an amino group, and a carboxy group, l and m are ach independently 0 or 1, and the sum of l and m is 0 to 2;

a denotes an alkylene group having 1 to 6 carbon atoms in a main chain, an alkylene group having 1 to 6 carbon atoms in the main chain substituted with an alkyl group having 1 to 6 carbon atoms, an alkylene group having 1 to 6 carbon atoms in the main chain substituted with a benzyl group, an alkylene group having 1 to 6 carbon atoms in the main chain substituted with an alkoxycarbonyl group, or an alkylene group having 1 to 6 carbon atoms in the main chain substituted with a phenyl group, and these alkylene groups may comprise at least one group selected from a group consisting of a hydroxy group, a thiol group, an amino group, and a carboxy group as a substituent, one of the $CH_2$s in the main chain of these alkylene groups may be substituted with O or S, or one of the CHs in the main chain of these alkylene groups may be substituted with N;

b denotes a phenylene group, a phenylene group substituted with an alkyl group having 1 to 6 carbon atoms, a phenylene group substituted with a nitro group, a phenylene group substituted with a halogen group, or a phenylene group substituted with an alkoxy group, and these phenylene groups may comprise at least one group selected from a group consisting of a hydroxy group, a thiol group, an amino group, and a carboxy group as a substituent;

c denotes a hydrogen atom, a carboxy group, an alkyl group having 1 to 6 carbon atoms in the main chain, or an alkyl group having 1 to 6 carbon atoms in the main chain substituted with an alkyl group having 1 to 5 carbon atoms, and these alkyl groups may comprise at least one group selected from a group consisting of a hydroxy group, a thiol group, an amino group, and a carboxy group as a substituent.

15. An electrophotographic apparatus comprising an electrophotographic photosensitive member comprising a support, an electroconductive layer, an undercoat layer, a charge generating layer, and a hole transporting layer, in this order, and a charging unit, an exposure unit, a development unit and a transfer unit, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer comprises an electron transporting compound and a compound (α), and when an ionization potential of the compound (α) is defined as IPα, the IPc, the IPu and the IPα satisfy relation (1):

$$IPu-IPc>IP\alpha-IPc \quad (1)$$

wherein the compound (α) is a compound represented by formula (α):

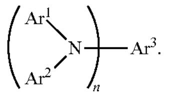

in formula (α), $Ar^1$ and $Ar^2$ each independently denote a substituted or unsubstituted phenyl group, $Ar^3$ denotes an n-valent aromatic group, and n is an integer of 1 to 3, and wherein the undercoat layer comprises a cured product of a composition comprising a compound represented by formula (B1) or (B2):

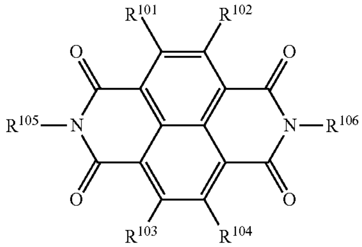

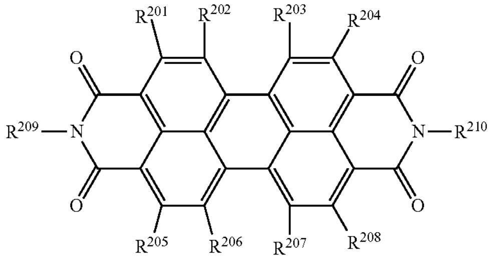

in formulae (B1) and (B2), $R^{101}$ to $R^{106}$ and $R^{201}$ to $R^{210}$ each independently denote a monovalent group represented by formula (C), a hydrogen atom, a cyano group, a nitro group, a halogen atom, an alkoxycarbonyl group, a substituted or unsubstituted alkyl group, a substituted or unsubstituted aryl group, or a substituted or unsubstituted heterocyclic group, provided that, at least one of $R^{101}$ to $R^{106}$ and at least one of $R^{201}$ to $R^{210}$ are monovalent groups represented by formula (C), one of the $CH_2$s of the alkyl group may be substituted with O or S, or one of the CHs of the alkyl group may be substituted with N, a substituent of the substituted alkyl group is at least one group selected from a group consisting of an aryl group, an alkoxycarbonyl group, a halogen atom, and a hydroxy group, a substituent of the substituted aryl group and a substituent of the substituted heterocyclic group are at least one group selected from a group consisting of a halogen atom, a nitro group, a cyano group, an alkyl group, an alkyl group substituted with a halogen group, and an alkoxy group:

$$-(a)_l-(b)_m-c \quad (C)$$

in formula (C), at least one of a, b, and c comprises at least one group selected from a group consisting of a hydroxy group, a thiol group, an amino group, and a carboxy group, l and m are each independently 0 or 1, and the sum of l and m is 0 to 2;

a denotes an alkylene group having 1 to 6 carbon atoms in a main chain, an alkylene group having 1 to 6 carbon atoms in the main chain substituted with an alkyl group having 1 to 6 carbon atoms, an alkylene group having 1 to 6 carbon atoms in the main chain substituted with a benzyl group, an alkylene group having 1 to 6 carbon atoms in the main chain substituted with an alkoxycarbonyl group, or an alkylene group having 1 to 6 carbon atoms in the main chain substituted with a phenyl group, and these alkylene groups may comprise at least one group selected from a group consisting of a hydroxy group, a thiol group, an amino group, and a carboxy group as a substituent, one of the $CH_2$s in the main chain of these alkylene groups may be substituted with O or S, or one of the CHs in the main chain of these alkylene groups may be substituted with N;

b denotes a phenylene group, a phenylene group substituted with an alkyl group having 1 to 6 carbon atoms, a phenylene group substituted with a nitro group, a phenylene group substituted with a halogen group, or a phenylene group substituted with an alkoxy group, and these phenylene groups may comprise at least one group selected from a group consisting of a hydroxy group, a thiol group, an amino group, and a carboxy group as a substituent;

c denotes a hydrogen atom, a carboxy group, an alkyl group having 1 to 6 carbon atoms in the main chain, or an alkyl group having 1 to 6 carbon atoms in the main chain substituted with an alkyl group having 1 to 5 carbon atoms, and these alkyl groups may comprise at least one group selected from a group consisting of a hydroxy group, a thiol group, an amino group, and a carboxy group as a substituent.

16. An electrophotographic apparatus comprising an electrophotographic photosensitive member comprising a support, an electroconductive layer, an undercoat layer, a charge generating layer, and a hole transporting layer, in this order, and a charging unit, an exposure unit, a development unit and a transfer unit, wherein when an ionization potential of the electroconductive layer is defined as IPc, the IPc is 5.4 to 5.8 eV, and when an ionization potential of the undercoat layer is defined as IPu, the IPu is 6.0 eV or more, and the undercoat layer is formed by copolymerization of a compound (3) with an electron transporting compound, and when an ionization potential of the compound (β) is defined as IPβ, the IPc, the IPu and the IPβ satisfy relation (2):

$$IPu-IPc>IP\beta-IPc \quad (2)$$

wherein the compound (3) is a compound represented by formula (3):

(β)

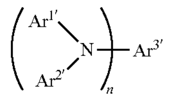

in formula (β), $Ar^{1'}$ and $Ar^{2'}$ each independently denote a substituted or unsubstituted phenyl group, provided that, at least one of $Ar^{1'}$ and $Ar^{2'}$ is a phenyl group substituted with a polymerizable functional group, $Ar^{3'}$ denotes an n-valent aromatic group, and n is an integer of 1 to 3, and wherein the undercoat layer comprises a cured product of a composition containing a compound represented by formula (B1) or (B2):

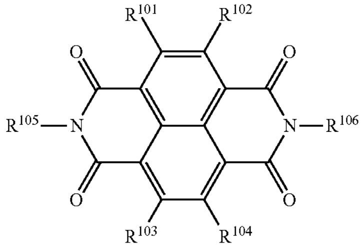

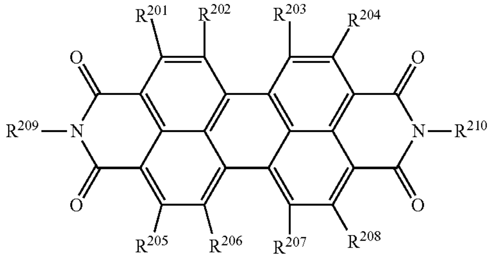

in formulae (B1) and (B2), $R^{101}$ to $R^{106}$ and $R^{201}$ to $R^{210}$ each independently denote a monovalent group represented by formula (C), a hydrogen atom, a cyano group, a nitro group, a halogen atom, an alkoxycarbonyl group, a substituted or unsubstituted alkyl group, a substituted or unsubstituted aryl group, or a substituted or unsubstituted heterocyclic group, provided that at least one of $R^{101}$ to $R^{106}$ and at least one of $R^{201}$ to $R^{210}$ are monovalent groups represented by formula (C), one of the $CH_2$s of the alkyl group may be substituted with O or S, or one of the CHs of the alkyl group may be substituted with N, a substituent of the substituted alkyl group is at least one group selected from a group consisting of an aryl group, an alkoxycarbonyl group, a halogen atom, and a hydroxy group, a substituent of the substituted aryl group and a substituent of the substituted heterocyclic group are at least one group selected from a group consisting of a halogen atom, a nitro group, a cyano group, an alkyl group, an alkyl group substituted with a halogen group, and an alkoxy group:

$$-(a)_l-(b)_m-c \quad (C)$$

in formula (C), at least one of a, b, and c comprise at least one group selected from a group consisting of a hydroxy group, a thiol group, an amino group, and a carboxy group, l and m are ach independently 0 or 1, and the sum of l and m is 0 to 2;

a denotes an alkylene group having 1 to 6 carbon atoms in a main chain, an alkylene group having 1 to 6 carbon atoms in the main chain substituted with an alkyl group having 1 to 6 carbon atoms, an alkylene group having 1 to 6 carbon atoms in the main chain substituted with a benzyl group, an alkylene group having 1 to 6 carbon atoms in the main chain substituted with an alkoxycarbonyl group, or an alkylene group having 1 to 6 carbon atoms in the main chain substituted with a phenyl group, and these alkylene groups may comprise at least one group selected from a group consisting of a hydroxy group, a thiol group, an amino group, and a carboxy group as a substituent, one of the $CH_2$s in the main chain of these alkylene groups may be substituted with O or S, or one of the CHs in the main chain of these alkylene groups may be substituted with N;

b denotes a phenylene group, a phenylene group substituted with an alkyl group having 1 to 6 carbon atoms, a phenylene group substituted with a nitro group, a phenylene group substituted with a halogen group, or a phenylene group substituted with an alkoxy group, and these phenylene groups may comprise at least one group selected from a group consisting of a hydroxy group, a thiol group, an amino group, and a carboxy group as a substituent;

c denotes a hydrogen atom, a carboxy group, an alkyl group having 1 to 6 carbon atoms in the main chain, or an alkyl group having 1 to 6 carbon atoms in the main chain substituted with an alkyl group having 1 to 5 carbon atoms, and these alkyl groups may comprise at least one group selected from a group consisting of a hydroxy group, a thiol group, an amino group, and a carboxy group as a substituent.

* * * * *